US008884988B1

(12) United States Patent
Cho et al.

(10) Patent No.: US 8,884,988 B1
(45) Date of Patent: Nov. 11, 2014

(54) PORTABLE DEVICE DISPLAYING AN AUGMENTED REALITY IMAGE AND METHOD OF CONTROLLING THEREFOR

(71) Applicant: LG Electronics Inc., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/193,061

(22) Filed: Feb. 28, 2014

(30) Foreign Application Priority Data

Jan. 29, 2014 (KR) ........................ 10-2014-0011085

(51) Int. Cl.
*G09G 5/00* (2006.01)
*G03H 1/00* (2006.01)
*G02B 27/14* (2006.01)
*G06K 9/00* (2006.01)
*G06T 19/00* (2011.01)

(52) U.S. Cl.
CPC .................................. *G06T 19/006* (2013.01)
USPC .......... 345/633; 345/7; 345/8; 345/9; 359/13; 359/630; 382/103

(58) Field of Classification Search
CPC .............. G02B 27/0093; G02B 27/01; G02B 27/0101; G02B 27/0103; G02B 27/0149; G02B 27/017; G02B 27/0172; G02B 27/0176; G02B 27/0179; G02B 27/0189; G02B 2027/01; G02B 2027/0101; G02B 2027/0138; G02B 2027/014; G02B 2027/0149; G02B 2027/0154; G02B 2027/0156; G02B 2027/0159; G02B 2027/017; G02B 2027/0172; G02B 2027/0178; G02B 2027/0179; G02B 2027/0187; G06F 3/011–3/013; G06Q 30/0261; G06Q 30/0643
USPC .................... 345/7–9, 419, 633; 359/13, 630; 382/103
See application file for complete search history.

(56) References Cited

U.S. PATENT DOCUMENTS

| 7,940,285 | B2 * | 5/2011 | Would et al. ................... 345/637 |
| 8,264,505 | B2 | 9/2012 | Bathiche et al. |
| 8,316,450 | B2 | 11/2012 | Robinson et al. |
| 2005/0030309 | A1 * | 2/2005 | Gettman et al. ............... 345/419 |
| 2005/0107952 | A1 | 5/2005 | Hoshino et al. |
| 2010/0238161 | A1 * | 9/2010 | Varga et al. .................... 345/419 |
| 2010/0292886 | A1 * | 11/2010 | Szczerba et al. ................ 701/29 |
| 2011/0052009 | A1 * | 3/2011 | Berkovich et al. ............ 382/106 |
| 2011/0304648 | A1 * | 12/2011 | Kim et al. ...................... 345/633 |
| 2012/0019557 | A1 | 1/2012 | Aronsson et al. |
| 2013/0076865 | A1 * | 3/2013 | Tateno et al. .................... 348/46 |
| 2013/0094696 | A1 * | 4/2013 | Zhang ............................ 382/103 |
| 2013/0301879 | A1 * | 11/2013 | Polo .............................. 382/103 |

* cited by examiner

*Primary Examiner* — Xiao Wu
*Assistant Examiner* — Michael J Cobb
(74) *Attorney, Agent, or Firm* — Birch, Stewart, Kolasch & Birch, LLP

(57) ABSTRACT

A portable device according to one embodiment of the present specification includes a camera unit configured to capture a surrounding image located in a front direction of the portable device, a display unit configured to display an image, and a processor configured to control the camera unit and the display unit, the processor is further configured to detect at least one of a predefined stationary object and a predefined moving object, if the moving object is detected, display a second augmented reality image corresponding to the moving object and countdown a second timer corresponding to the second augmented reality image, detect a movement of the moving object, if the movement of the moving object is detected before the second setting time of the second timer elapses, adjust the second timer.

19 Claims, 16 Drawing Sheets

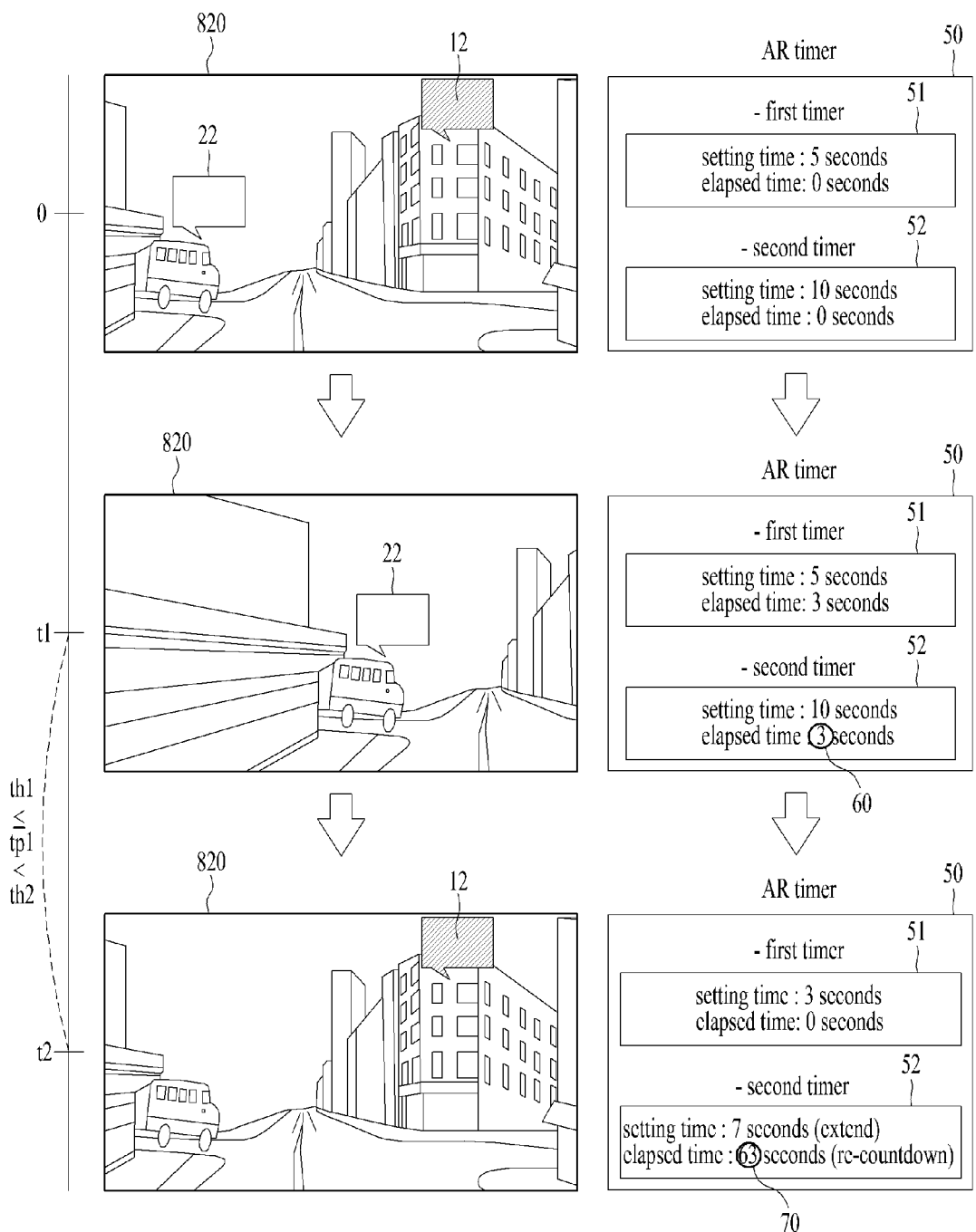

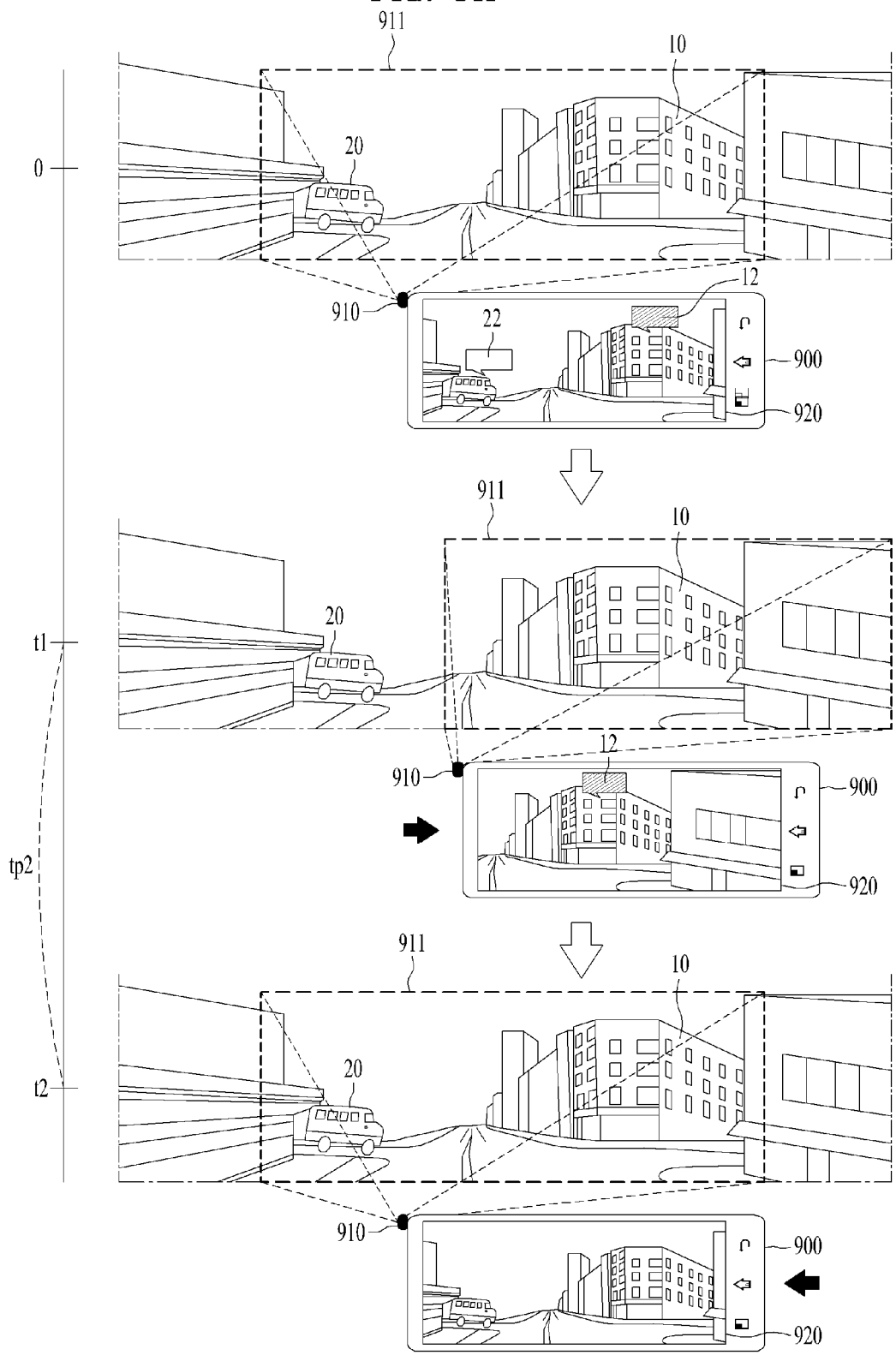

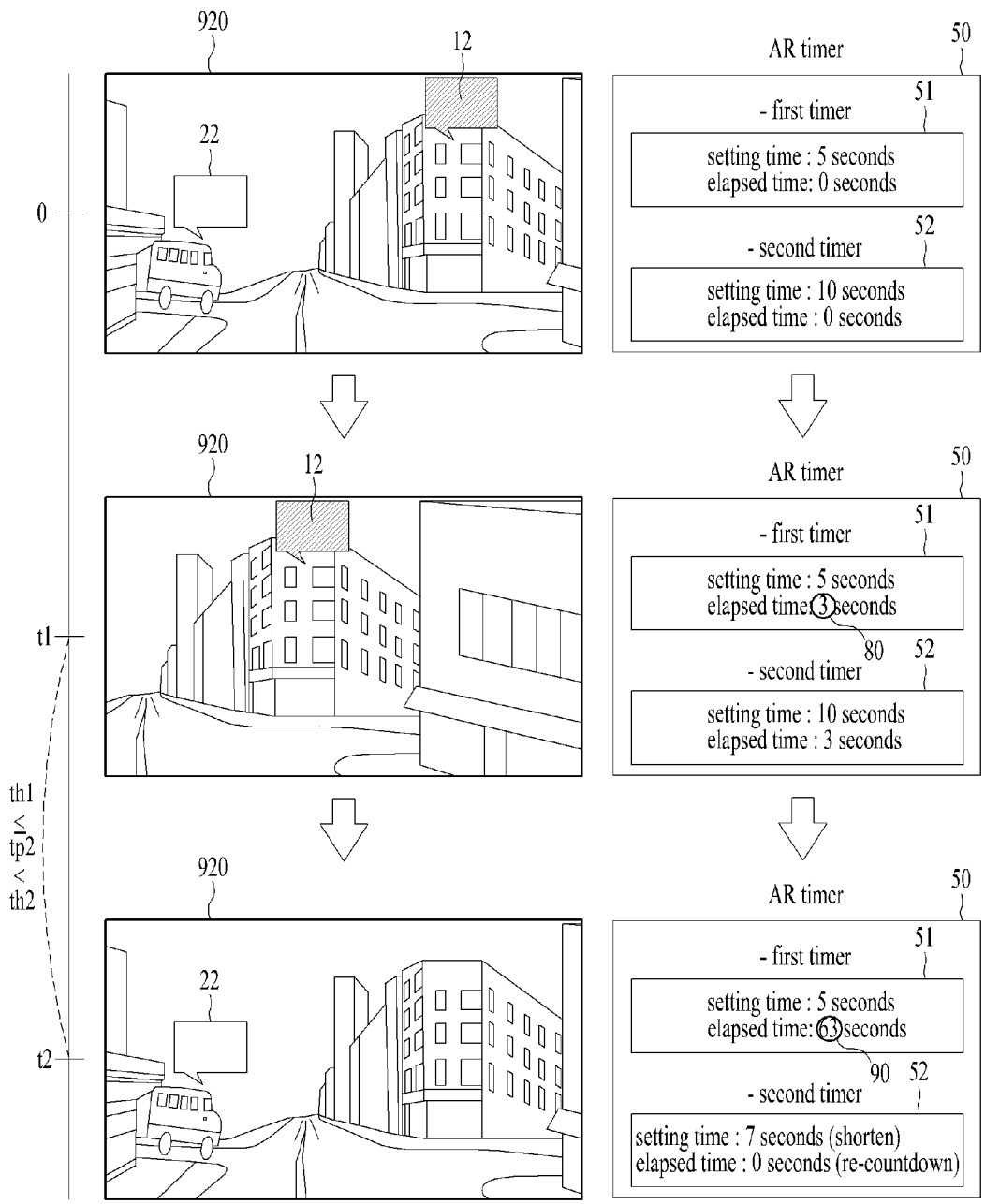

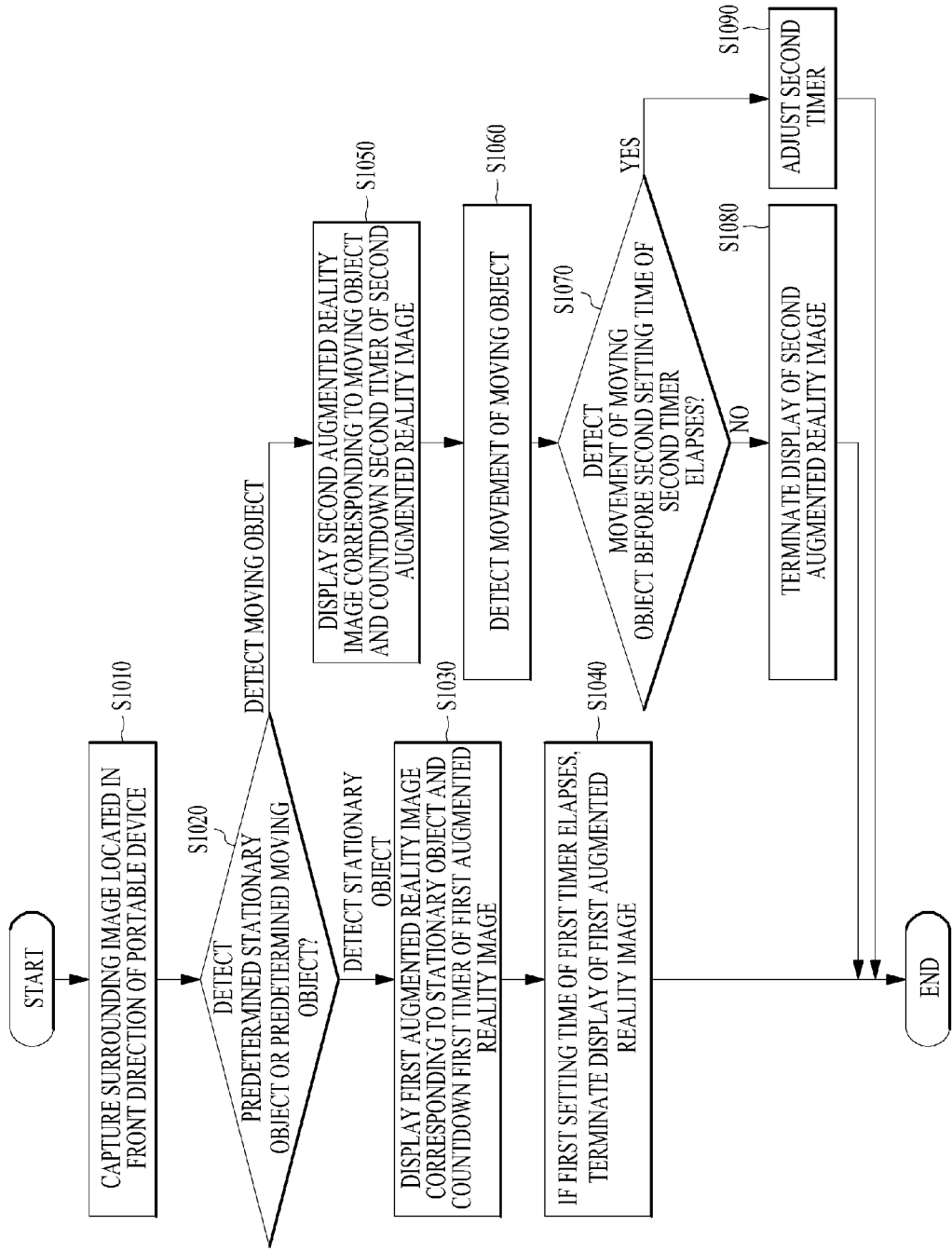

PORTABLE DEVICE DISPLAYING AN AUGMENTED REALITY IMAGE AND METHOD OF CONTROLLING THEREFOR

This application claims the benefit of the Korean Patent Application No. 10-2014-0011085, filed on Jan. 29, 2014, which is hereby incorporated by reference as if fully set forth herein.

BACKGROUND OF THE INVENTION

1. Field of the Invention

The present specification relates to a portable device, and more particularly, to a portable device displaying an augmented reality image and a method of controlling therefor.

2. Discussion of the Related Art

As technologies are developing, a portable device changes itself as a smart device capable of providing various services to a user. Recently, the portable device is utilized as a device providing an augmented reality (AR) service, which corresponds to a service showing a real image and a virtual image (AR image) together in a manner of mixing both images.

Since the portable device providing a legacy augmented reality service displays an augmented reality image in a limited display screen for an identical display time irrespective of a type of the augmented reality image, it is difficult for a user to easily obtain preferred information from the augmented reality image.

SUMMARY OF THE INVENTION

Accordingly, the present specification is directed to an apparatus and method thereof that substantially obviate one or more problems according to limitations and disadvantages of the related art.

In providing an augmented reality service, an object of the present specification is to provide a portable device configured to change display time of an augmented reality image according to a type of the augmented reality image and whether the augmented reality image has moved or not and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a portable device includes a camera unit configured to capture a surrounding image located in a front direction of the portable device, a display unit configured to display an image, and a processor configured to control the camera unit and the display unit, wherein the processor is further configured to detect at least one of a predefined stationary object and a predefined moving object from the captured surrounding image, if the stationary object is detected, display a first augmented reality image corresponding to the stationary object and countdown a first timer of the first augmented reality image, terminate a display of the first augmented reality image when a first setting time of the first timer elapses, if the moving object is detected, display a second augmented reality image corresponding to the moving object and countdown a second timer of the second augmented reality image, detect a movement of the moving object, terminate a display of the second augmented reality image when a second setting time of the second timer elapses, if the movement of the moving object is detected before the second setting time of the second timer elapses, adjust the second timer, wherein the second setting time may be different from the first setting time.

To further achieve these objects and other advantages and in accordance with the purpose of the invention, as embodied and broadly described herein, according to one embodiment, a method of controlling a portable device includes the steps of capturing a surrounding image located in a front direction of the portable device, detecting at least one of a predefined stationary object and a predefined moving object from the captured surrounding image, if the stationary object is detected, displaying a first augmented reality image corresponding to the stationary object and countdown a first timer of the first augmented reality image, terminating a display of the first augmented reality image when a first setting time of the first timer elapses, if the moving object is detected, displaying a second augmented reality image corresponding to the moving object and countdown a second timer of the second augmented reality image, detecting a movement of the moving object, terminating a display of the second augmented reality image when a second setting time of the second timer elapses and if the movement of the moving object is detected before the second setting time of the second timer elapses, adjusting the second timer, wherein the second setting time may be different from the first setting time.

According to the present specification, a portable device can detect at least one of a stationary object and a moving object from a surrounding image captured by a camera unit.

According to the present specification, a portable device can differently configure a setting time of a first timer for a first augmented reality image corresponding to a stationary object and a setting time of a second timer for a second augmented reality image corresponding to a moving object.

According to the present specification, a portable device can detect a movement of a moving object.

According to the present specification, if a movement of a moving object is detected before a setting time of a second timer for a second augmented reality image elapses, a portable device can adjust a display time of the second augmented reality image by adjusting the second timer.

According to the present specification, a portable device can sense a movement or a rotation of the portable device.

According to the present specification, if a stationary object or a moving object is not detected anymore or detected again according to a movement or a rotation of a portable device, the portable device can change a method of displaying an augmented reality image according to a re-detected time period.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8A-8D are diagrams of a method for a portable device according to one embodiment of the present specification to display an augmented reality image in case that the portable device moves or rotates;

FIGS. 9A-9D are diagrams of a method for a portable device according to a different embodiment of the present specification to display an augmented reality image in case that the portable device moves or rotates;

FIG. 10 is a flowchart for a method of controlling a portable device according to one embodiment of the present specification.

DETAILED DESCRIPTION OF THE INVENTION

While embodiments have been described in detail with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device may correspond to a device of various forms capable of being carried and displaying an augmented reality image. For instance, the portable device may correspond to a head mounted display, a smartphone, a smart pad, a tablet computer, a notebook, a music player, or a foldable display device. And, in the present specification, the augmented reality image may be a virtual image for providing additional information about a real environment. In this case, the augmented reality image may include a graphic image, a text, a sign, and an emoticon.

Figure 1:
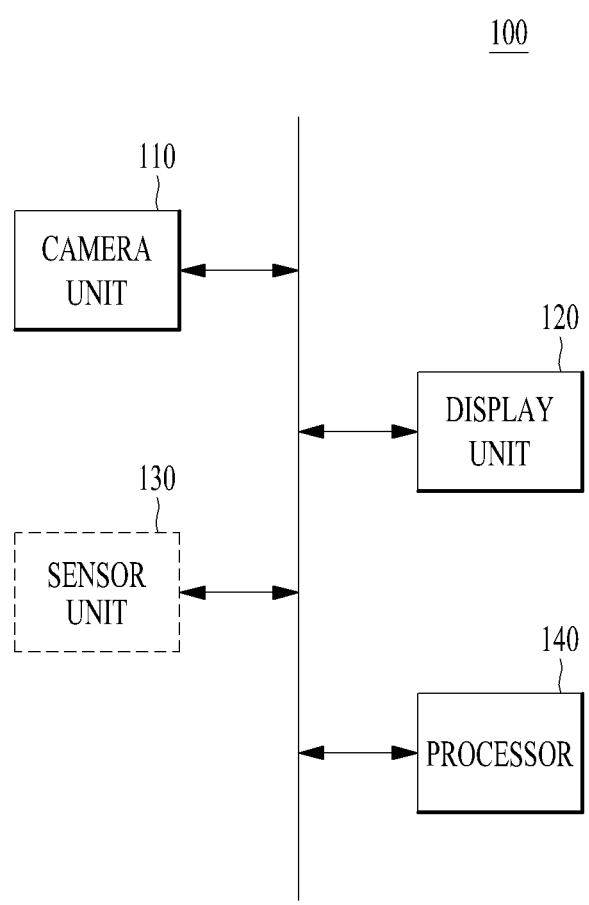
FIG. 1 is a block diagram of a portable device according to one embodiment of the present specification.

FIG. 1 is a block diagram of a portable device according to one embodiment of the present specification.

Referring to FIG. 1, the portable device 100 can include a camera unit 110, a display unit 120, a sensor unit 130, and a processor 140.

The camera unit 110 may capture a surrounding image located in a front direction of the portable device 100. In this case, the captured surrounding image may include at least one real object and the real object may include a marker of an augmented reality image. In this case, the real object may mean an actual object existing in a real space. In this case, the marker may correspond to a promised pattern or code included on a surface of the real object or the real object itself.

The display unit 120 may display an image. The display unit 120 may display an image of at least one real object captured by the camera unit 110. And, the display unit 120 may display at least one augmented reality image. For instance, the display unit 120 may detect a marker which is included in a real object captured by the camera unit 110 and display an augmented reality image corresponding to the detected marker. As a different example, the display unit 120 may display an augmented reality image, which is obtained based on location information and direction information of the portable device, corresponding to a surrounding environment of the portable device. In this case, the portable device 100 may obtain the location information and the direction information of the portable device based on information sensed by the sensor unit 130. By doing so, the portable device 100 may display the augmented reality image without detecting the marker using the camera unit 110.

According to one embodiment, if the portable device corresponds to a head mounted display, the display unit 120 may consist of an optical see-through display panel. If the display unit 120 consists of the optical see-through panel, the display unit 120 may not display an image of a real object. In this case, the display unit 120 may display an augmented reality image on a real object of a real space, which is seen by a user via the see-through display panel.

The sensor unit 130 may correspond to an optional configuration of the portable device. The sensor unit 130 may sense a user input or environment of a device using at least one sensing means installed in the device and deliver a sensed result to the processor 140.

The at least one sensing means may include such a sensing means as gravity sensor, a motion sensor, a gyroscope sensor, an acceleration sensor, an infrared sensor, a tilt (inclination) sensor, a bending sensor, an audio sensor, a video sensor, an image sensor, a GPS (global positioning system) sensor, a touch sensor, and the like. The aforementioned sensors may be included in the portable device as a separate element or may be included in the portable device 100 in a manner of being combined to at least one element.

The sensor unit 130 may sense a movement or a rotation of the portable device using at least one sensing means. And, the sensor unit 130 may be activated or deactivated according to whether an augmented reality image is displayed on the display unit 120.

The processor 140 may control at least one unit installed in the portable device 100. More specifically, the processor controls each of the aforementioned units and may control transmission and/or reception of data between units.

The processor 140 may detect at least one of a predefined stationary object and a predefined moving object from a surrounding image captured by the camera unit 110. In addition, the processor 140 may detect a plurality of stationary objects and/or a plurality of moving objects from the surrounding image captured by the camera unit 110. Here, the stationary object may be defined as a real object incapable of moving a position of the object by itself and the moving object may be defined as a real object capable of moving a position of the object by itself. For instance, a car, a bus, and the like may correspond to the moving object and a building and the like may correspond to the stationary object. The processor 140 may determine whether an object corresponds to the moving object or the stationary object based on GPS information of the object. For instance, the processor 140 determines an object including a changing GPS coordinate as the moving object and may determine an object including a fixed GPS coordinate as the stationary object.

The processor 140 may display a first augmented reality image corresponding to the stationary object and countdown a first timer of the first augmented reality image. In this case, the processor 140 may display the first augmented reality image with a predetermined method. In addition, the processor 140 may display the first augmented reality image based on a location of the stationary object. For instance, the processor 140 may display the first augmented reality image in a location within a first distance from the location of the stationary object. In particular, the processor 140 may display the first augmented reality image in a position adjacent to the stationary object. In this case, the first distance is inputted to the portable device by a user or may correspond to a time set by a manufacturer in the process of manufacturing the portable device. And, when a setting time of the first timer elapses, the processor 140 may terminate the display of the first augmented reality image.

The processor 140 may display a second augmented reality image corresponding to a moving object and countdown a second timer of the second augmented reality image. In this case, the processor 140 may display the second augmented reality image with a predetermined method. In addition, the processor 140 may display the second augmented reality image based on a location of the moving object. For instance, the processor 140 may display the second augmented reality image in a location within a second distance from the location of the moving object. In particular, the processor 140 may display the second augmented reality image in a position adjacent to the moving object. In this case, the second distance is inputted to the portable device by a user or may correspond to a time set by a manufacturer in the process of manufacturing the portable device. And, if the location of the moving object is modified, the processor 140 may change the position of the second augmented reality image. And, when a setting time of the second timer elapses, the processor 140 may terminate the display of the second augmented reality image.

The processor 140 may detect a movement of a moving object. For instance, when the second augmented reality image is displayed, the processor 140 may detect the movement of the moving object. In this case, the processor 140 may detect the movement of the moving object based on a location change of the moving object on a surrounding image captured by the camera unit or a location change of an image of the moving object displayed in the display unit. In addition, the processor may detect the movement of the moving object based on a change of a GPS coordinate of the moving object. And, if the movement of the moving object is detected before the setting time of the second timer elapses, the processor may adjust the second timer.

The aforementioned operations of the processor 140 are explained in detail with reference to drawings in the following. In the following description, it may represent that the processor 140 controls the portable device 100 or at least one unit included in the portable device 100. And, the processor 140 and the portable device 100 may be explained in a manner of identifying the processor with the portable device.

FIG. 1 is a block diagram according to one embodiment. Blocks represented in a manner of being separated indicate the logically distinguished elements of the portable device 100. Hence, the elements of the aforementioned portable device 100 may be equipped with a single chip or a plurality of chips according to the design of the portable device 100.

FIG. 2 to FIG. 8 explains a case that one stationary object and one moving object are detected as an example. Yet, following description may be applied to a case that one stationary object or one moving object is detected as well. Moreover, the following description may also be applied to a case that a plurality of stationary objects and/or a plurality of moving objects are detected.

Figure 2:
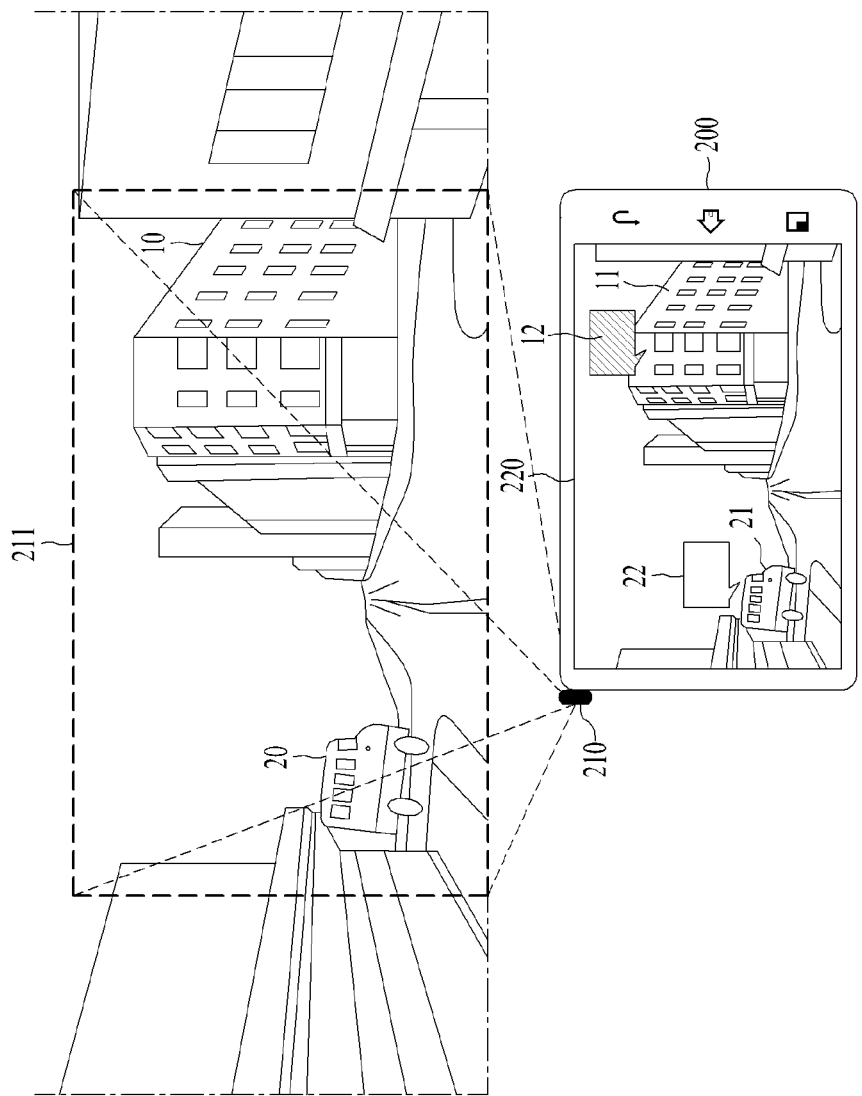
FIG. 2 is a diagram for a portable device according to one embodiment of the present specification.

FIG. 2 is a diagram for a portable device according to one embodiment of the present specification.

More specifically, FIG. 2 is a diagram for a smartphone which is one example of a portable device. The portable device 200 may include a camera unit 210 and a display unit 220.

The portable device may capture a surrounding image located in a front direction of the portable device 200 using the camera unit 210 within an angle of view 211. In this case, the angle of view 211 may indicate an area capable of being detected by an image sensor included in the camera unit 210. That is, if the angle of view 211 of the camera unit 210 becomes wider, an optical image of a wider area may be detected and the optical image may be converted to a digital image. Here, the front direction of the portable device 200 may correspond to a direction to which a camera installed in the rear side of the portable device 200 faces. In addition, the front direction of the portable device 200 may correspond to an opposite direction of a direction in which the display unit is installed. For instance, if the portable device 200 is equipped with a front side display unit, the front direction of the portable device 200 may correspond to a direction to which the camera installed in the rear side of the portable device 200 faces. As a different example, if the portable device is equipped with a double-sided display unit, the front direction of the portable device 200 may correspond to a direction to which the camera installed in the front side or rear side of the portable device 200 faces.

The portable device 200 may detect a stationary object 10 and a moving object 20 from the captured surrounding image. In this case, each of the stationary object 10 and the moving object 20 may include a marker of the augmented reality image, respectively. Hence, the portable device 200 may detect each marker of the stationary object 10 and the moving object 20 using the camera unit 210 within the angle of view 211.

The portable device 200 may display a stationary object image 11 and a moving object image 21 on the display unit 220. Moreover, the portable device 200 may display a first augmented reality image 12 corresponding to the marker of the stationary object 10 and a second augmented reality image 22 corresponding to the marker of the moving object 20 in the display unit 220. By doing so, although a user cannot see the augmented reality image with the naked eyes, the user may check the augmented reality image via the display unit 220 of the portable device 200.

Figure 3:
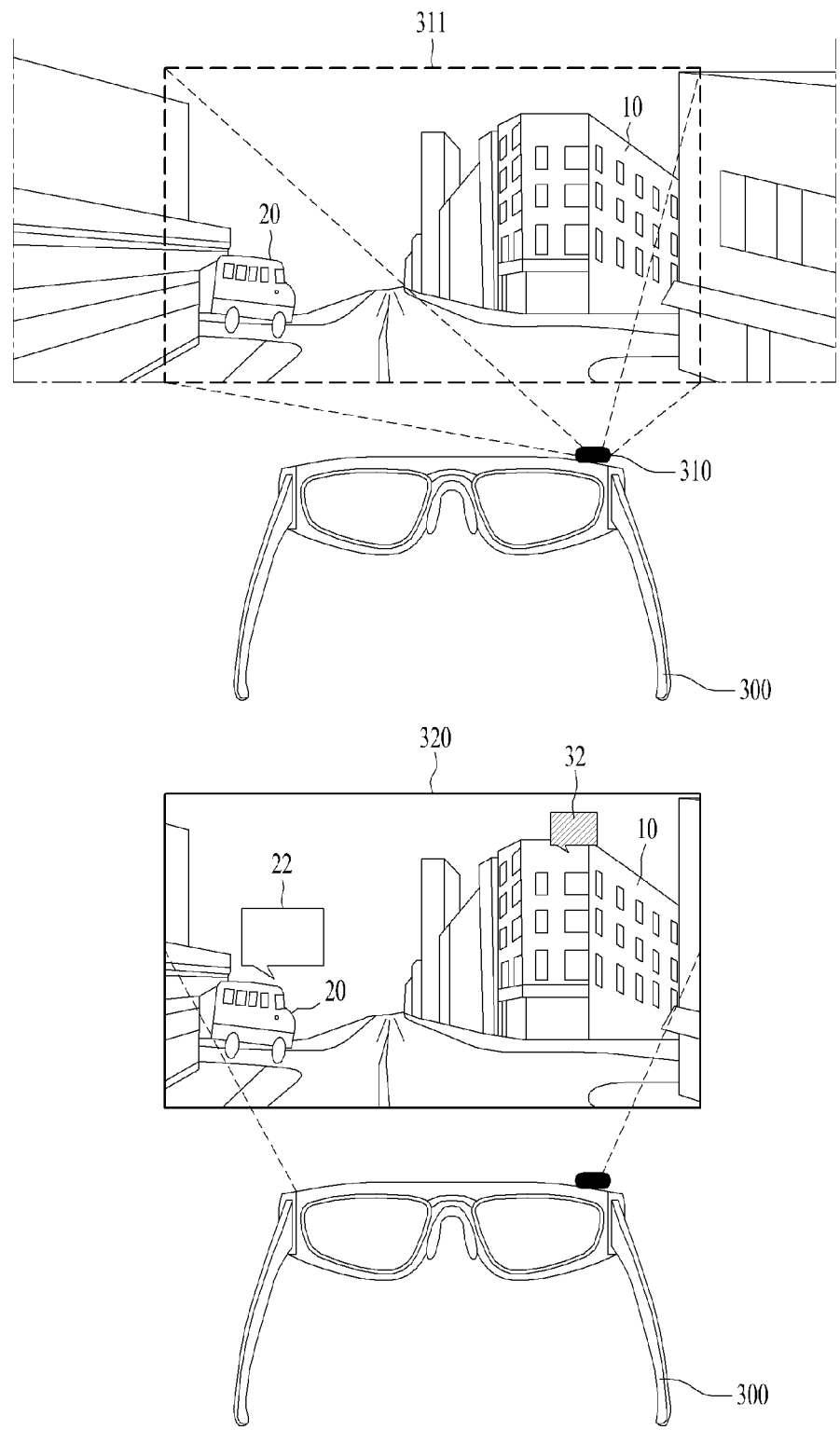
FIG. 3 is a diagram for a portable device according to a different embodiment of the present specification.

FIG. 3 is a diagram for a portable device according to one embodiment of the present specification.

More specifically, FIG. 3 is a diagram for a head mounted display which is an example of the portable device. The portable device 300 may include a camera unit 310 and a display unit 320. If the portable device 300 corresponds to a head mounted display, the display unit 320 may include a projector configured to project an image. Moreover, if the portable device corresponds to the head mounted display, the display unit 320 may consist of an optical see-through display panel.

The top of FIG. 3 shows a case that the portable device 300 captures a surrounding image located in a front direction of the portable device 300 using the camera unit 310.

Referring to the top of FIG. 3, the portable device 300 may capture a surrounding image located in a front direction of the portable device 300 using the camera unit 310 within an angle of view 311. In this case, the angle of view 311 may indicate an area capable of being detected by an image sensor included in the camera unit 310. That is, if the angle of view 311 of the camera unit 310 becomes wider, an optical image of a wider area may be detected and the optical image may be converted to a digital image. Here, the front direction of the portable device 300 may correspond to a direction to which a camera installed in the front side of the portable device 300 faces. In addition, the front direction of the portable device 300 may correspond to a direction to which a user wearing the head mounted display faces.

The portable device 300 may detect a stationary object 10 and a moving object 20 from the captured surrounding image. In this case, each of the stationary object 10 and the moving object 20 may include a marker of the augmented reality image, respectively. Hence, the portable device 300 may detect each marker of the stationary object 10 and the moving object 20 using the camera unit 310 within the angle of view 311.

The bottom of FIG. 3 shows a case that the portable device displays an augmented reality image using the display unit 320.

Referring to the bottom of FIG. 3, if the portable device 300 corresponds to a head mounted display, the portable device 300 may include two display units 320 corresponding to each of the eyes. The portable device 300 may display a first augmented reality image 32 corresponding to the marker of the stationary object 10 and a second augmented reality image 22 corresponding to the marker of the moving object 20 on the display unit 320. Yet, if the portable device 300 corresponds to a head mounted display, the portable device 300 may not display the image of the stationary object and the image of the moving object on the display unit 320. That is, the portable device may display the first augmented reality image 32 and the second augmented reality image 22 on the stationary object 10 and the moving object 20 of the real space, which is seen by the user via the see-through display panel. By doing so, although the user cannot see the augmented reality image with the naked-eyes, the user may check the augmented reality image via the display unit 320 of the portable device 300.

FIG. 4 to FIG. 9 explains a case that the portable device corresponds to a smartphone. Yet, following description may also be applied to a case that the portable device corresponds to such a different type of portable device as a head mounted display or the like.

Figure 4:
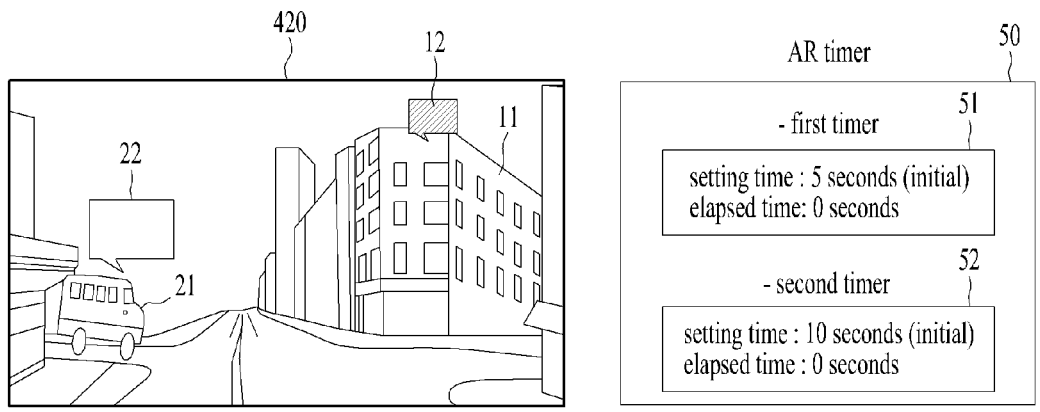
FIG. 4 is a diagram of a method for a portable device according to one embodiment of the present specification to display an augmented reality image.

FIG. 4 is a diagram of a method for a portable device according to one embodiment of the present specification to display an augmented reality image.

The portable device may detect at least one of a predetermined stationary object and a predetermined moving object from a surrounding image captured by the camera unit. In addition, the portable device may display a first augmented reality image 12 corresponding to the detected stationary object and/or a second augmented reality image 22 corresponding to the detected moving object. When an augmented reality image is displayed, the portable device may activate an augmented reality timer 50. In this case, the augmented reality timer 50 may include a first timer 51 and/or a second timer 52. Here, the first timer 51 is a timer corresponding to the first augmented reality image 12 and the second timer 52 is a timer corresponding to the second augmented reality image 22.

The left of FIG. 4 shows a method for the portable display to display a first augmented reality image corresponding to a stationary object and a second augmented reality image corresponding to a moving object when the stationary object and the moving object are detected.

Referring to the left of FIG. 4, if the stationary object and the moving object are detected, the portable device may display a stationary object image 11 and a moving object image 21 on the display unit 420 and may display a first augmented reality image 12 corresponding to the stationary object and a second augmented reality image 22 corresponding to the moving object. Yet, as mentioned in the foregoing description, if the portable device corresponds to a head mounted display, the portable device may display the first augmented reality image 12 and the second augmented reality image 22 on the stationary object and the moving object of the real space, which is seen by a user via a see-through display panel, instead of displaying the stationary object image 11 and the moving object image 21.

The right of FIG. 4 shows an augmented reality timer.

Referring to the right of FIG. 4, an augmented reality timer 50 may include at least one of a first timer 51 and a second timer 52. The portable device may activate the first timer 51 when the first augmented reality image 12 is displayed and may activate the second timer 52 when the second augmented reality image 22 is displayed. In this case, the first 51 and the second timer 52 may be activated together on an identical time. For instance, if the first 12 and the second augmented reality image 22 are displayed on a same time, the portable device may activate the first 51 and the second timer 52 on the same time. And, the first 51 and the second timer 52 may be activated on a time different from each other.

Here, the first timer 51 may have a setting time and an elapsed time of the first timer and the second timer 52 may have a setting time and an elapsed time of the second timer. In the following description, for clarity, the setting time of the first timer 51 is called a first setting time and the setting time of the second timer 52 is called a second setting time. The first and the second setting time are inputted to the portable device by a user or may correspond to time set by a manufacturer in the process of manufacturing the portable device. And, the first setting time may be set by a time different from the second setting time. For instance, the second setting time may be set to be longer than the first setting time. By doing so, a user may observe the second augmented reality image 22 corresponding to the moving object for longer than the first augmented reality image 12 corresponding to the stationary object.

As depicted in the left of FIG. 4, when the first augmented reality image 12 and the second augmented reality image 22 are displayed, the portable device may activate the first timer 51 of the first augmented reality image 12 and the second timer 52 of the second augmented reality image 22. In this case, as depicted in the drawing, an initial value of the second setting time of the second timer 52 is set to '10 seconds', which is longer than '5 seconds' set for an initial value of the first setting time of the first timer 51. By doing so, a user may observe the second augmented reality image 22 corresponding to the moving object for longer than the first augmented reality image 12 corresponding to the stationary object. When the first timer 51 and the second timer 52 are activated, the portable device may countdown the elapsed time of the first timer 51 and the elapsed time of the second timer 52.

Figure 5:
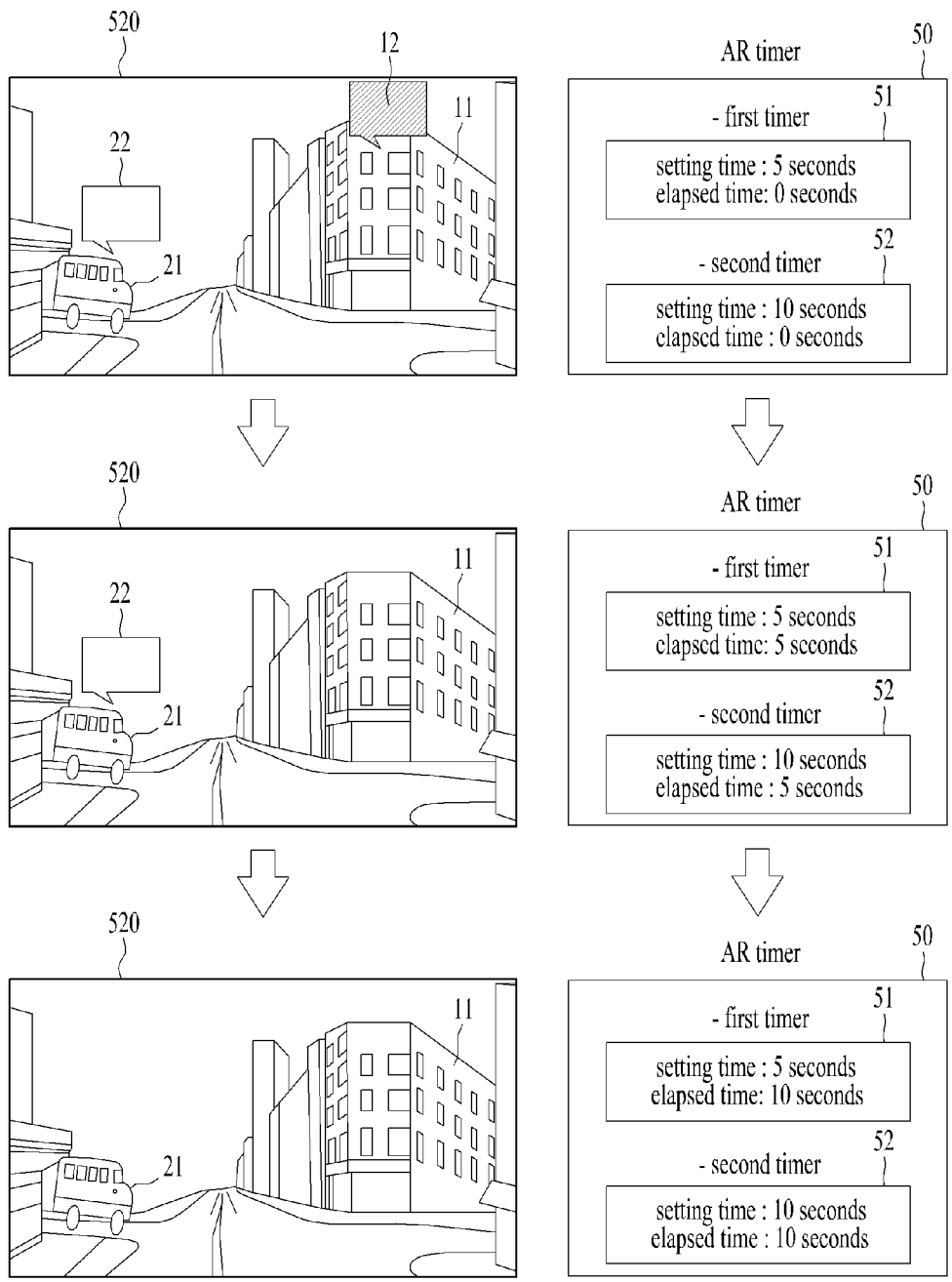
FIG. 5 is a diagram of a method for a portable device according to a different embodiment of the present specification to display an augmented reality image.

FIG. 5 is a diagram of a method for a portable device according to a different embodiment of the present specification to display an augmented reality image.

The top left of FIG. 5 shows a method for the portable device to display the first augmented reality image corresponding to the stationary object and the second augmented reality image corresponding to the moving object when the stationary and the moving object are detected. The top right of FIG. 5 shows the augmented reality timer.

Referring to the two drawings positioned on the top of FIG. 5, if the stationary and the moving object are detected, the portable device displays a stationary object image 11 and a moving object image 21 on the display unit 520 and may display the first augmented reality image 12 corresponding to the stationary object and the second augmented reality image 22 corresponding to the moving object. Yet, as mentioned in the foregoing description, if the portable device corresponds to a head mounted display, the portable device may not display the stationary object image 11 and the moving object image 21.

The portable device may activate the first timer 51 of the first augmented reality image 12 and the second timer 52 of the second augmented reality image 22. As depicted in the drawing, the first 51 and the second timer 52 may be activated on a same time. In addition, as depicted in the drawing, the second setting time of the second timer 52 may be set to '10 seconds', which is longer than '5 seconds' set for the first setting time of the first timer 51. When the first 51 and the second timer 52 are activated, the portable device may countdown the elapsed time of the first timer 51 and the elapsed time of the second timer 52.

The middle left of FIG. 5 shows a method for the portable display to display the first augmented reality image when the first setting time of the first timer elapsed. And, the middle right of FIG. 5 shows the augmented reality timer when the first setting time of the first timer elapsed.

Referring to two drawings positioned in the middle of FIG. 5, if the first setting time of the first timer 51 elapses, (i.e., if 5 seconds elapse from a countdown of the first timer 51), the portable device may terminate the display of the first augmented reality image 12. In this case, if the second setting time of the second timer 52 does not elapse, (i.e., if 10 seconds do not elapse from a countdown of the second timer 52), the portable device may maintain the display of the second augmented reality image 22.

The bottom left of FIG. 5 shows a method for the portable display to display the second augmented reality image when the second setting time of the second timer elapsed. And, the bottom right of FIG. 5 shows the augmented reality timer when the second setting time of the second timer elapsed.

Referring to two drawings positioned in the bottom of FIG. 5, if the second setting time of the second timer 52 elapses, (i.e., if 10 seconds elapse from a countdown of the second timer 52), the portable device may terminate the display of the second augmented reality image 12.

And, when the stationary object is continuously detected after the first setting time of the first timer 51 has elapsed, the portable device may maintain the termination of the display of the first augmented reality image 12. By doing so, the portable device may prevent the augmented reality image already observed by a user from being displayed again, thereby reducing power consumption.

Figure 6:
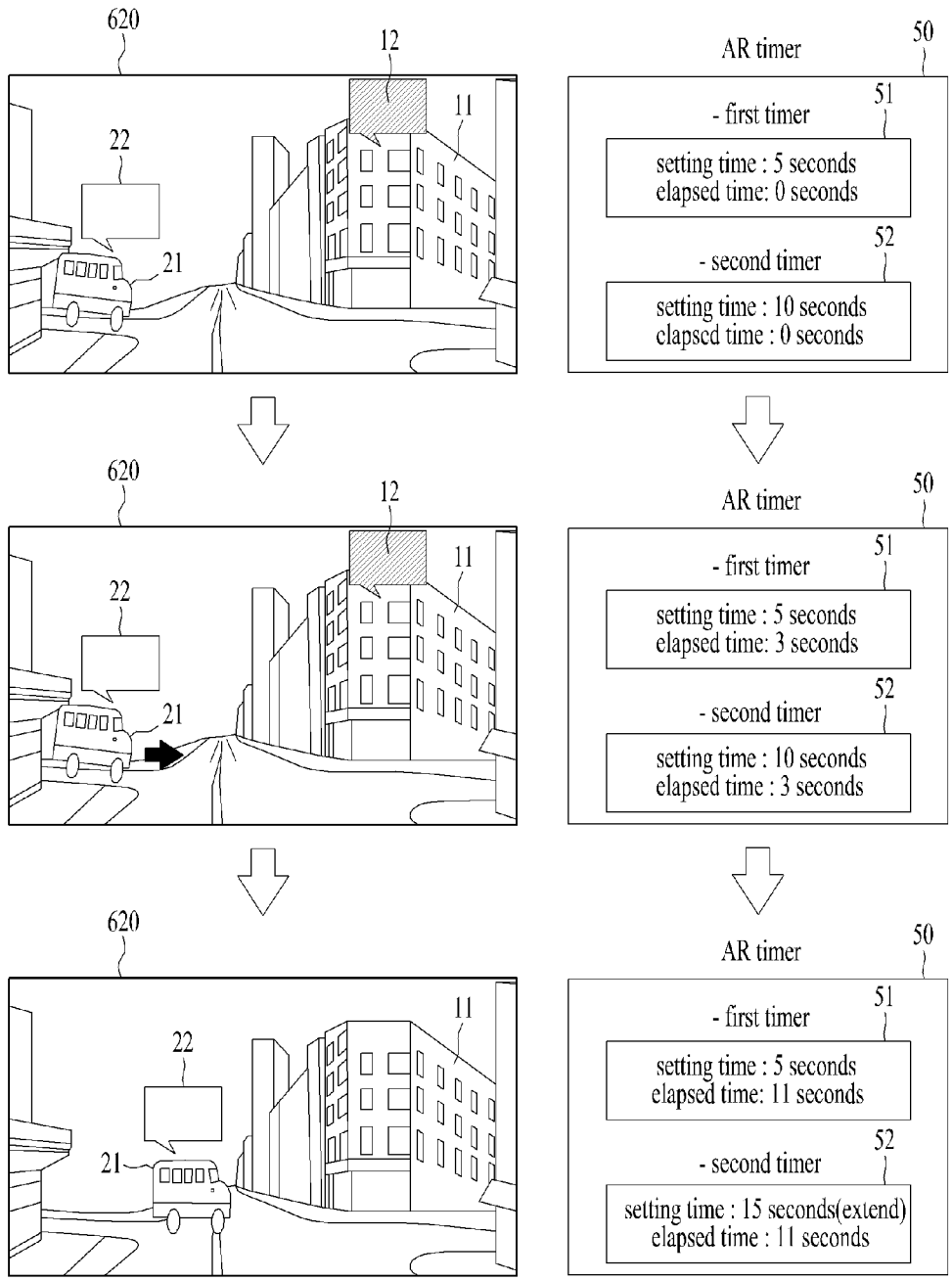
FIG. 6 is a diagram of a method for a portable device according to a different embodiment of the present specification to display an augmented reality image.

FIG. 6 is a diagram of a method for a portable device according to a different embodiment of the present specification to display an augmented reality image.

As mentioned in the foregoing description, the portable device may include a display unit 620, may display a stationary object image 11 and a moving object 21 image on the display unit 620, and may display a first augmented reality image 12 corresponding to the stationary object and a second augmented reality image 22 corresponding to the moving object. In addition, the portable device may include a first timer 51 of the first augmented reality image 12 and a second timer 52 of the second augmented reality image 22.

The top left of FIG. 6 shows a method for the portable device to display the first augmented reality image corresponding to the stationary object and the second augmented reality image corresponding to the moving object when the stationary object and the moving object are detected. The top right of FIG. 6 shows the augmented reality timer when the stationary object and the moving object are detected.

Since explanation on two drawings of the top of FIG. 6 is identical to the content mentioned earlier with reference to the two drawings of the top of FIG. 4 and FIG. 5, detailed explanation is omitted.

The middle left of FIG. 6 shows a method for the portable device to display the second augmented reality image when a movement of the moving object is detected before the second setting time of the second timer elapses. The middle right of FIG. 6 shows the augmented reality timer when the movement of the moving object is detected before the second setting time of the second timer elapses.

Referring to the two drawings positioned in the middle of FIG. 6, the portable device may detect a movement of a moving object. For instance, if the second augmented reality image 22 is displayed, the portable device may detect the movement of the moving object. The portable device may detect the movement of the moving object based on a location change of the moving object on a surrounding image captured by the camera unit or a location change of the moving object image 21 displayed on the display unit. For instance, if the location of the moving object changes from a first location to a second location on the surrounding image captured by the camera unit and a distance between the first location and the second location is detected by the distance longer than a first distance, the portable device may detect the movement of the moving object. As a different example, if a location of a moving object image 21 displayed on the display unit changes from a third location to a fourth location and a distance between the third location and the fourth location is detected by the distance longer than the first distance, the portable device may detect the movement of the moving object. Moreover, the portable device may detect the movement of the moving object based on a change of a GPS coordinate of the moving object. For instance, if the GPS coordinate of the moving object changes from a first coordinate to a second coordinate and a distance between the first coordinate and the second coordinate is detected by the distance longer than the first distance, the portable device may detect the movement of the moving object. In this case, the first distance may mean a minimum moving distance of the moving object required to detect the movement of the moving object. The first distance may be inputted to the portable device by a user or may correspond to a distance set by a manufacturer in the process of manufacturing the portable device. By doing so, if the moving object stops after moving a very short distance which is shorter than the first distance, the portable device may determine it as the moving object did not move.

If the movement of the moving object is detected before the second setting time of the second timer 52 elapses, the portable device may adjust the second timer 52. For instance, the portable device may adjust the second timer in a manner that the second setting time is extended as much as a first extension time. In this case, the first extension time may be inputted to the portable device by a user or may correspond to a time set by a manufacturer in the process of manufacturing the portable device. As depicted in the drawing, the portable device may adjust the second timer 52 from '10 seconds' to '15 seconds' in a manner of extending the second setting time as much as '5 seconds'. As a different example, the portable device may adjust the second timer 52 to make the second timer 52 to be reset. That is, the portable device may activate the second timer again and may countdown the elapsed time again. By doing so, the portable device enables a user to observe a moving object in which a movement is detected longer.

And, if the movement of the moving object is detected, the portable device may display an indicator indicating the movement of the moving object. By doing so, a user may be aware the movement of the moving object and may also be aware that the second timer of the second augmented reality image is adjusted.

The bottom left of FIG. 6 shows a method for the portable device to display the first augmented reality image and the second augmented reality image when the second timer is adjusted and the bottom right of FIG. 6 shows the augmented reality timer when the second timer is adjusted.

Referring to two drawings of the bottom of FIG. 6, when the second timer 52 is adjusted, the portable device may determine whether the second setting time of the adjusted second timer 52 elapses. For instance, if the second timer 52 is adjusted in a manner that the second setting time is extended as much as a first extension time, the portable device may determine whether the extended second setting time of the second timer 52 elapses. That is, as depicted in the drawing, if the second timer 52 is adjusted in a manner that the second setting time is extended as much as '5 seconds', the portable device may determine whether '15 seconds', which correspond to the extended second setting time of the second timer 52, elapses.

If the extended second setting time of the second timer 52 does not elapse, the portable device may maintain a display of a second augmented reality image 22. On the contrary, if the extended second setting time of the second timer 52 elapses, the portable device may terminate the display of the second augmented reality image 22. And, if a movement of the moving object is detected on the timing that the extended second setting time of the second timer 52 elapses, the portable device may extend again the extended second setting time of the second timer 52 as much as a second extension time. In this case, the second extension time may be inputted to the portable device by a user or may correspond to a time set by a manufacturer in the process of manufacturing the portable device. In this case, the second extension time may be set to a time shorter than the aforementioned first extension time. And, if a movement of the moving object is detected on the timing that the once more extended second setting time of the second timer 52 elapses, the portable device may further extend the once more extended second setting time of the second timer 52.

And, as a different example, if the second timer 52 is adjusted to make the second timer 52 to be reset, the portable device may determine whether the second setting time of the reset second timer 52 elapses. That is, if the second timer is activated again and the elapsed time of the second timer is countdown again, the portable device may determine whether the second setting time of the reset second timer 52 elapses. If the second setting time of the reset second timer 52 does not elapse, the portable device may maintain the display of the second augmented reality image 22. If the second setting time of the reset second timer 52 elapses, the portable device may terminate the display of the second augmented reality image 22. And, if a movement of the moving object is detected on the timing that the second setting time of the reset second timer 52 elapses, the portable device may reset again the second timer. And, if a movement of the moving object is detected on the timing that the second setting time of the once more reset second timer 52 elapses, the portable device may reset again the reset second timer 52.

And, if the movement of the moving object is continuously detected after the second timer is adjusted, the portable device continuously maintains the display of the second augmented reality image 22 and may stop the countdown to the elapsed time of the second timer. That is, if movements of the moving object is continuously detected after that second timer is adjusted, the portable device may continuously display the second augmented reality image 22. In this case, the portable device may countdown the elapsed time of the second timer again when detection of the movement of the moving object is terminated. By doing so, the portable device enables a user to continuously observe an augmented reality image corresponding to a moving object in which a movement is detected.

Figure 7:
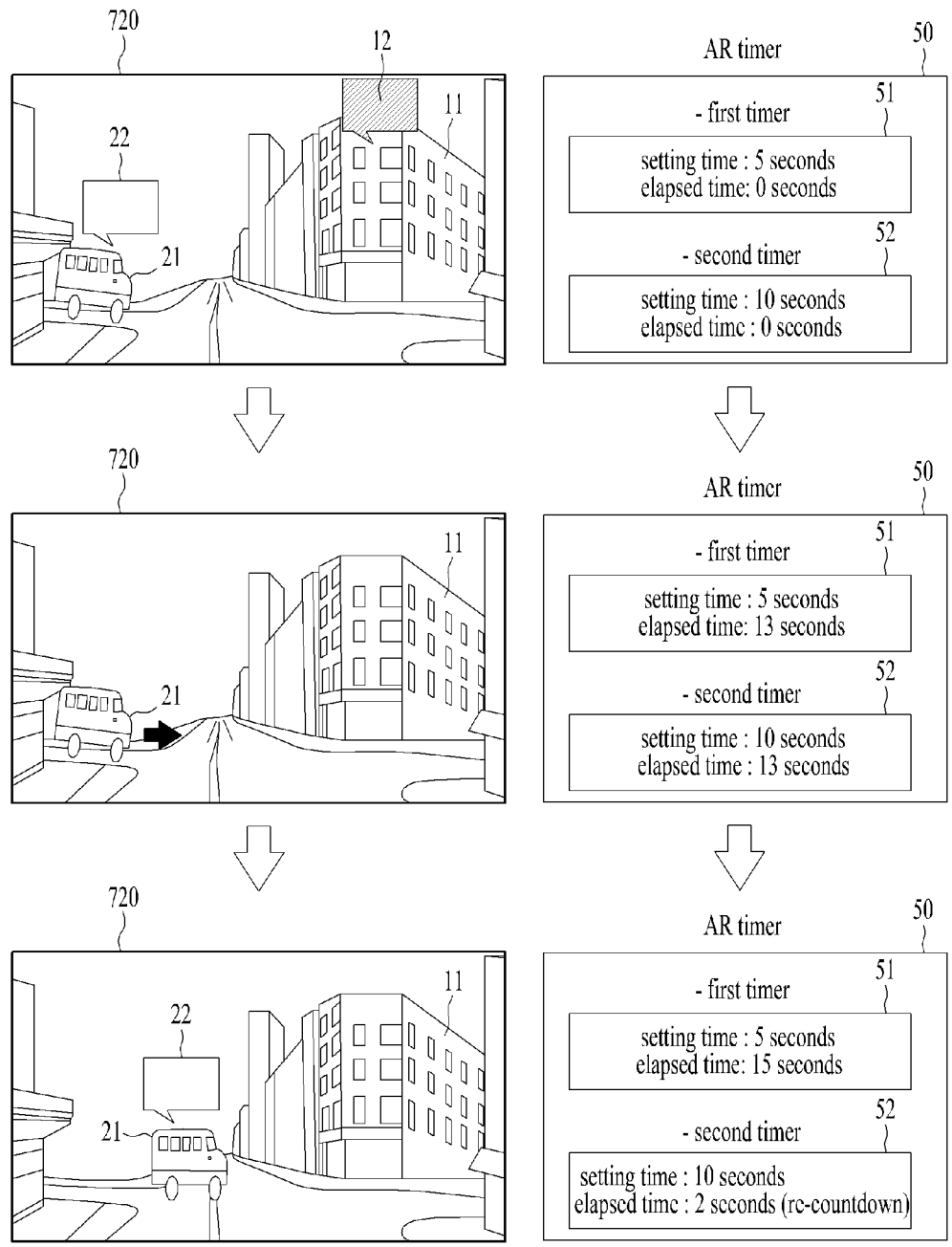
FIG. 7 is a diagram of a method for a portable device according to a different embodiment of the present specification to display an augmented reality image.

FIG. 7 is a diagram of a method for a portable device according to a different embodiment of the present specification to display an augmented reality image.

Referring to FIG. 7, as mentioned in the foregoing description, the portable device may include a display unit 720, displays a stationary object image 11 and a moving object image 21 on the display unit 720, and may display a first augmented reality image 12 corresponding to the stationary object and a second augmented reality image 22 corresponding to the moving object. In addition, the portable device may include a first timer 51 of the first augmented reality image 12 and a second timer 52 of the second augmented reality image 22.

The top left of FIG. 7 show a method for the portable device to display the first augmented reality image 12 corresponding to the stationary object and the second augmented reality image 22 corresponding to the moving object when the stationary object and the moving object are detected. The top right of FIG. 7 shows an augmented reality timer when the stationary object and the moving object are detected.

Since explanation on two drawings of the top of FIG. 7 is identical to the content mentioned earlier with reference to the two drawings of the top of FIG. 4 and FIG. 5, detailed explanation is omitted.

The middle left of FIG. 7 shows a method for the portable device to display the second augmented reality image when a second setting time of the second timer has elapsed. The middle right of FIG. 7 shows an augmented reality timer when a movement of the moving object is detected after the second setting time of the second timer has elapsed.

Referring to the middle of FIG. 7, if a first setting time of the first timer 51 and the second setting time of the second timer 52 elapse, the portable device may terminate the display of the first augmented reality image 12 and the second augmented reality image 22. In addition, the portable device may detect a movement of the moving object. For instance, as depicted in the drawing, if the moving object is continuously detected after the display of the second augmented reality image 22 is terminated, the portable device may detect the movement of the moving object. Since the method for the portable device to detect the movement of the moving object is identical to the content mentioned earlier with reference to the two drawings of the middle of FIG. 6, detailed explanation is omitted.

The bottom left of FIG. 7 shows a method for the portable device to display the second augmented reality image when the moving object is detected after the second setting time of the second timer has elapsed. The bottom right of FIG. 7 shows the augmented reality timer when the moving object is detected after the second setting time of the second timer has elapsed.

Referring to two drawings of the bottom of FIG. 7, if a movement of the moving object is detected after the display of the second augmented reality image 12 is terminated, the portable device displays the second augmented reality image 12 again and may countdown the second timer 52 again. In this case, the second setting time of the second timer 52 may be identical to an initial setting time. For instance, as depicted in the drawing, if the second augmented reality image 12 is displayed again, the second setting time of the second timer may be set to '10 seconds' which is identical to the initial setting time. On the contrary, when the second augmented reality image 12 is displayed again, the portable device may adjust the second timer 52 to make the second setting time of the second timer 52 to be shortened. By doing so, the portable device may shorten displaying time of the augmented reality image, which has been already observed by a user.

FIG. 8a to FIG. 8d are diagrams of a method for a portable device according to one embodiment of the present specification to display an augmented reality image when the portable device moves or rotates. Although FIG. 8a to FIG. 8d are explained with a case that the portable device moves from side to side, following description may also be applied to a case that the portable device moves to every direction or a case that the portable device rotates.

Referring to FIG. 8a to FIG. 8d, the portable device 800 may include a camera unit 810 and a display unit 820. The portable device 800 may capture a surrounding image located in a front direction of the device using the camera unit 810 within an angle of view 811 area and detect a stationary object 10 and a moving object 20 from the captured image. As mentioned in the foregoing description, the portable device 800 may display a first augmented reality image 12 corresponding to the stationary object and a second augmented reality image 22 corresponding to the moving object on the display unit 820. In addition, the portable device may include a first timer 51 of the first augmented reality image 12 and a second timer 52 of the second augmented reality image 22.

Figure 8A:
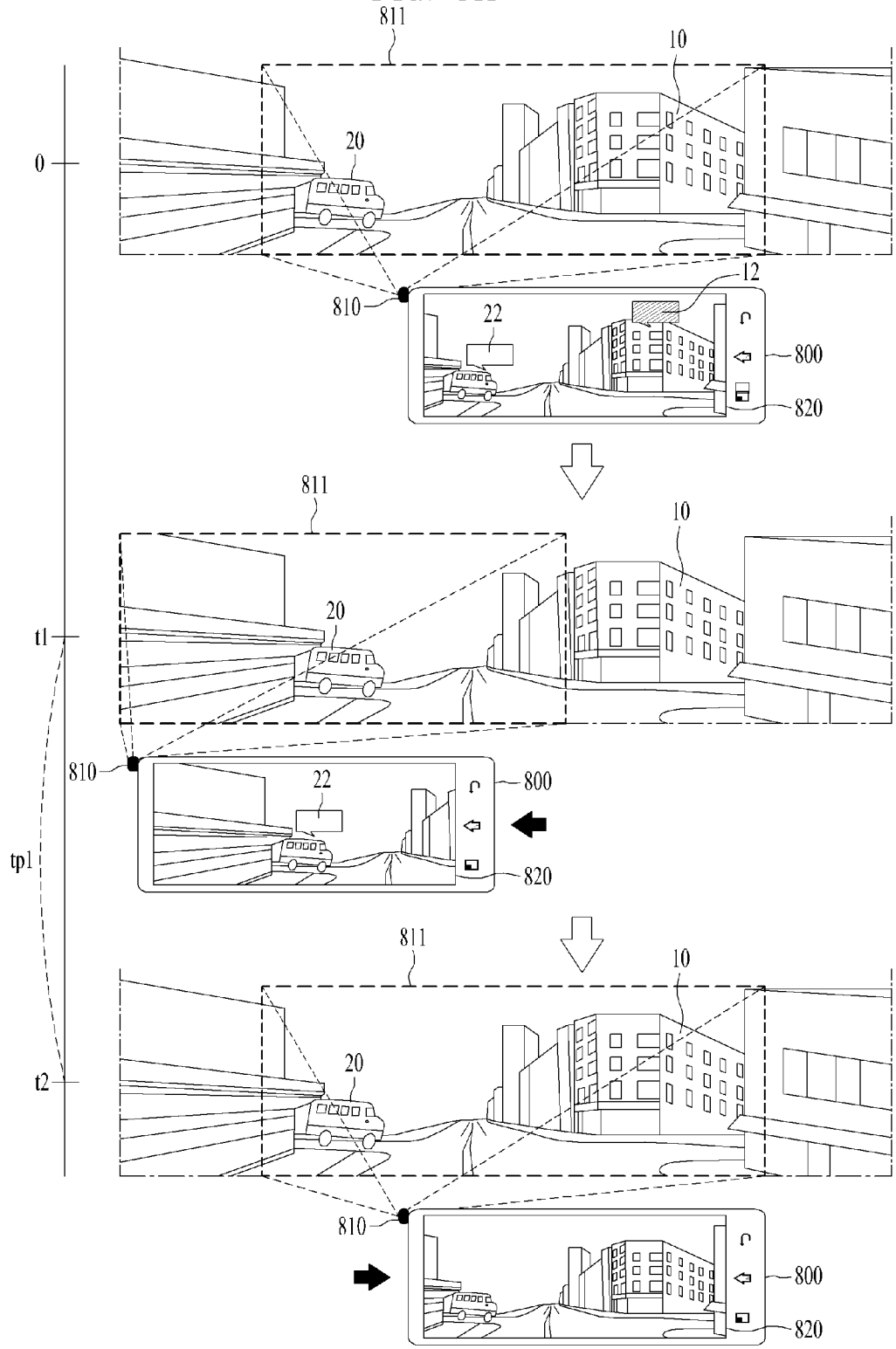

FIG. 8a shows a method for the portable device to display an augmented reality image corresponding to a stationary object when the portable device moves or rotates.

The top of FIG. 8a shows a method for the portable device to display a first augmented reality image corresponding to the stationary object and a second augmented reality image corresponding to a moving object when the stationary object and the moving object are detected.

Since explanation on the top of FIG. 8a is identical to the content mentioned earlier with reference to the two drawings of the top of FIG. 4 and FIG. 5, detailed explanation is omitted.

The middle of FIG. 8a shows a method for the portable device to display the first augmented reality image when detection on the stationary object is terminated according to a movement or a rotation of the portable device.

Referring to the middle of FIG. 8a, the portable device 800 may detect the movement or the rotation of the portable device using a sensor unit. The portable device 800 may activate the sensor unit when at least one augmented reality image is displayed on the display unit 810. In addition, the portable device 800 may determine whether detection on a stationary object 10 is terminated according to the movement or the rotation of the portable device 800. If the movement or the rotation of the portable device 800 is detected and the detection on the stationary object 10 is terminated according to the movement or the rotation of the portable device 800, the portable device 800 may terminate a display of a first augmented reality image 12 corresponding to the stationary object 10. On the contrary, if the stationary object 10 is continuously detected despite of the movement or the rotation of the portable device 800, the portable device 800 may maintain the display of the first augmented reality image 12 corresponding to the stationary object 10. And, as depicted in the drawing, if a moving object 20 is continuously detected despite of the movement or the rotation of the portable device 800, the portable device 800 may maintain a display of a second augmented reality image corresponding to the moving object 20.

The bottom of FIG. 8a shows a method for the portable device to display the first augmented reality image when the stationary object is detected again according to the movement or the rotation of the portable device.

Referring to the bottom of FIG. 8a, if the movement or the rotation of the portable device 800 is detected after the display of the first augmented reality image 12 is terminated and the stationary object 10 is detected again according to the movement or the rotation of the portable device 800, the portable device 800 may obtain a first time period (tp 1) corresponding to a period between a time (t1) on which detection on the stationary object 10 is terminated and a time (t2) on which the stationary object 10 is detected again. If the first time period is less than a first threshold time period, the portable device 800 may not display the first augmented reality image 12 again. On the contrary, if the first time period is more than the first threshold time period, the portable device 800 displays the first augmented reality image 12 again and may countdown a first timer of the first augmented reality image 12 again. In this case, the first threshold time period may be inputted to the portable device 800 by a user or may correspond to a time period set by a manufacturer in the process of manufacturing the portable device 800. Regarding this, it shall be explained in detail with reference to FIG. 8b to FIG. 8d in the following.

Figure 8B:
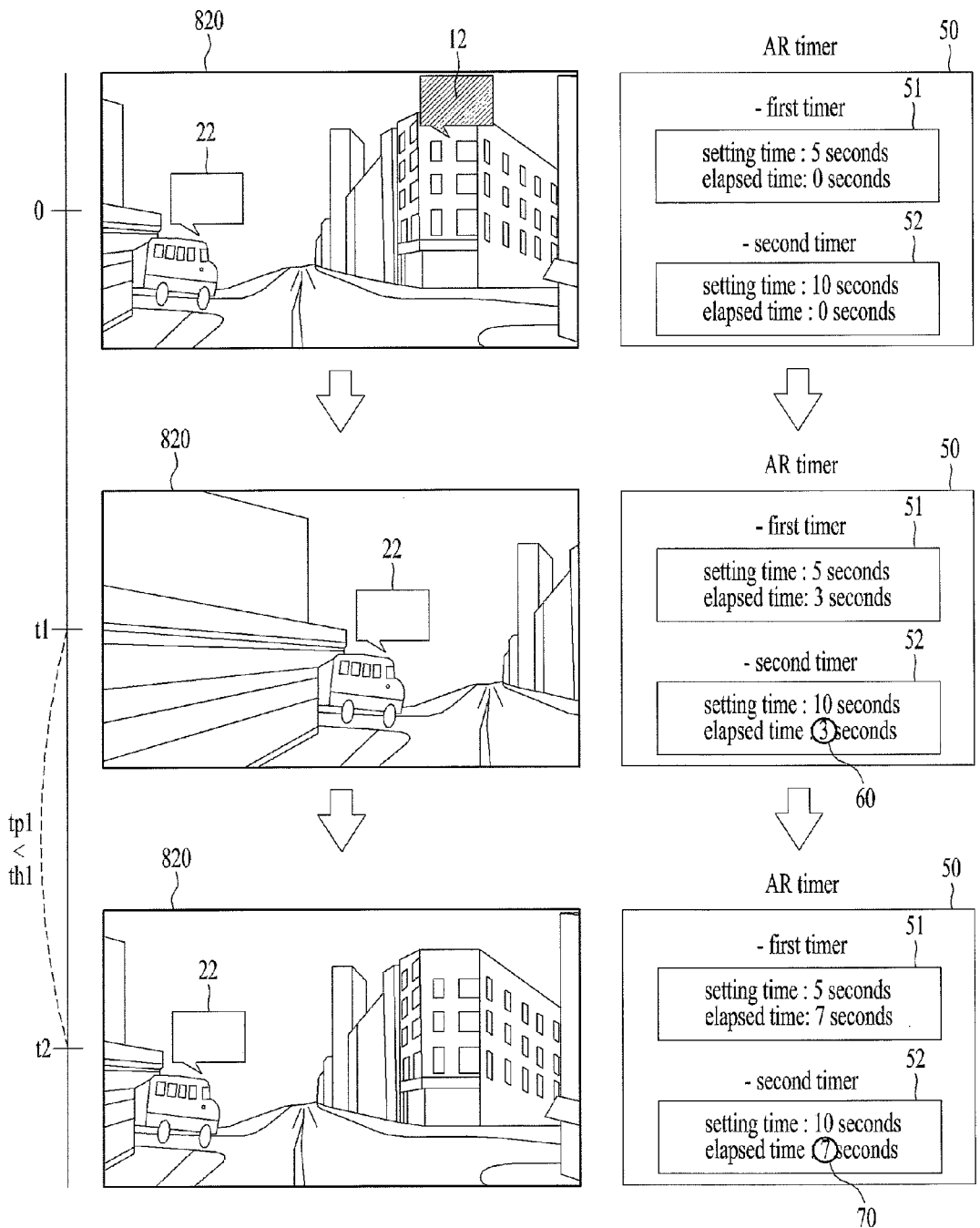

FIG. 8b shows a method for the portable device to display the first augmented reality image corresponding to the stationary object when the first time period is less than the first threshold time period and FIG. 8b shows an augmented reality timer as well. Assume that the first threshold time period is set to '5 seconds' in FIG. 8b.

The top left of FIG. 8b shows a method for the portable device to display a first augmented reality image corresponding to a stationary object and a second augmented reality image corresponding to a moving object when the stationary object and the moving object are detected. The top right of FIG. 8b shows an augmented reality timer when the stationary object and the moving object are detected.

Since explanation on two drawings of the top of FIG. 8b is identical to the content mentioned earlier with reference to the two drawings of the top of FIG. 4 and FIG. 5, detailed explanation is omitted.

The middle left of FIG. 8b shows a method for the portable device to display the first augmented reality image when detection on the stationary object is terminated according to a movement or a rotation of the portable device. The middle right of FIG. 8b shows an augmented reality timer when the detection on the stationary object is terminated according to the movement or the rotation of the portable device. Since explanation on the middle left of FIG. 8b is identical to the explanation on the middle of FIG. 8a, detailed explanation on an overlapped part is omitted.

Referring to two drawings of the middle of FIG. 8*b*, the portable device may detect a movement or a rotation of the portable device using a sensor unit. In addition, the portable device may determine whether detection on a stationary object is terminated according to the movement or the rotation of the portable device. As depicted in the drawing, if the movement or the rotation of the portable device is detected before a setting time of a first timer 51 for a first augmented reality image 12 elapses and detection on the stationary object is terminated according to the movement or the rotation of the portable device, the portable device may terminate the display of the first augmented reality image 12 corresponding to the stationary object. On the contrary, if the stationary object is continuously detected despite of the movement or the rotation of the portable device, the portable device may maintain the display of the first augmented reality image 12 corresponding to the stationary object. And, as depicted in the drawing, if a moving object is continuously detected despite of the movement or the rotation of the portable device, the portable device may maintain a display of a second augmented reality image corresponding to the moving object.

The bottom left of FIG. 8*b* shows a method for the portable device to display the first augmented reality image when the stationary object is detected again according to the movement or the rotation of the portable device and the bottom right of FIG. 8*b* shows an augmented reality timer when the stationary object is detected again according to the movement or the rotation of the portable device.

Referring to two diagrams of the bottom of FIG. 8*b*, if the movement or the rotation of the portable device is detected after the display of the first augmented reality image 12 is terminated and the stationary object is detected again according to the movement or the rotation of the portable device, the portable device may obtain a first time period (tp 1) corresponding to a period between a time (t1) 60 on which detection on the stationary object is terminated and a time (t2) 70 on which the stationary object is detected again. As depicted in the bottom left of FIG. 8*b*, the portable device may obtain '4 seconds' corresponding to a time period between '3 seconds' and '7 seconds' as the first time period. In this case, as depicted in the drawing, if the first time period is less than a first threshold time period (th1), the portable device may not display the first augmented reality image again. That is, if the stationary object is detected again within a short time period (e.g., within '5 seconds') after the detection on the stationary object is terminated, the portable device may not display the augmented reality image corresponding to the stationary object. By doing so, a user may terminate a display of an uninteresting augmented reality image in a manner of returning the portable device to an original position after the portable device is moved or rotated for a short time. That is, the user may maintain a display of an interesting augmented reality image only.

FIG. 8*c* shows a method for the portable device to display a first augmented reality image corresponding to a stationary object when the first time period is more than a first threshold time period (th1) and less than a second threshold time period (th2). FIG. 8*c* shows an augmented reality timer as well. In FIG. 8*c*, assume that the first threshold time period and the second threshold time period are set to '5 seconds' and '10 minutes', respectively.

The top left of FIG. 8*c* shows a method for the portable device to display a first augmented reality image corresponding to a stationary object and a second augmented reality image corresponding to a moving object when the stationary object and the moving object are detected. The top right of FIG. 8*c* shows an augmented reality timer when the stationary object and the moving object are detected.

Since explanation on two drawings of the top of FIG. 8*c* is identical to the content mentioned earlier with reference to the two drawings of the top of FIG. 4 and FIG. 5, detailed explanation is omitted.

The middle left of FIG. 8*c* shows a method for the portable device to display the first augmented reality image when detection on the stationary object is terminated according to a movement or a rotation of the portable device. The middle right of FIG. 8*c* shows an augmented reality timer when the detection on the stationary object is terminated according to the movement or the rotation of the portable device.

Since explanation on two diagrams of the middle of FIG. 8*c* is identical to the explanation on the two diagrams of the middle of FIG. 8*b*, detailed explanation is omitted.

The bottom left of FIG. 8*c* shows a method for the portable device to display the first augmented reality image when the stationary object is detected again according to the movement or the rotation of the portable device and the bottom right of FIG. 8*c* shows an augmented reality timer when the stationary object is detected again according to the movement or the rotation of the portable device.

Referring to two diagrams of the bottom of FIG. 8*c*, if the movement or the rotation of the portable device is detected after the display of the first augmented reality image 12 is terminated and the stationary object is detected again according to the movement or the rotation of the portable device, the portable device may obtain a first time period (tp 1) corresponding to a period between a time (t1) 60 on which detection on the stationary object is terminated and a time (t2) 70 on which the stationary object is detected again. As depicted in the bottom left of FIG. 8*c*, the portable device may obtain '60 seconds' corresponding to a time period between '3 seconds' and '63 seconds' as the first time period. In this case, as depicted in the drawing, if the first time period is more than a first threshold time period and less than a second threshold time period, the portable device displays the first augmented reality image 12 again and may countdown a first timer 51 of the first augmented reality image 12 again. In this case, the second threshold time period may be inputted to the portable device by a user or may correspond to a time period set by a manufacturer in the process of manufacturing the portable device. And, the second threshold time period may correspond to a time period greater than the first threshold time period.

And, when the first augmented reality image 12 is displayed again, the portable device may adjust a first setting time of the first timer 51. For instance, as depicted in the drawing, the portable device may adjust the first timer 51 to make the first setting time of the first timer 51 to be shortened. That is, if a user used to observe the first augmented reality image and the second augmented reality image intends to observe the first augmented reality image again in a manner of moving the portable device after intensively observing the second augmented reality image for a specific time period in a manner of moving the portable device, since it is not necessary for the portable display to display the previously displayed first augmented reality image again for an identical displaying time, the portable display may shorten the setting time of the first timer of the first augmented reality image.

Figure 8D:
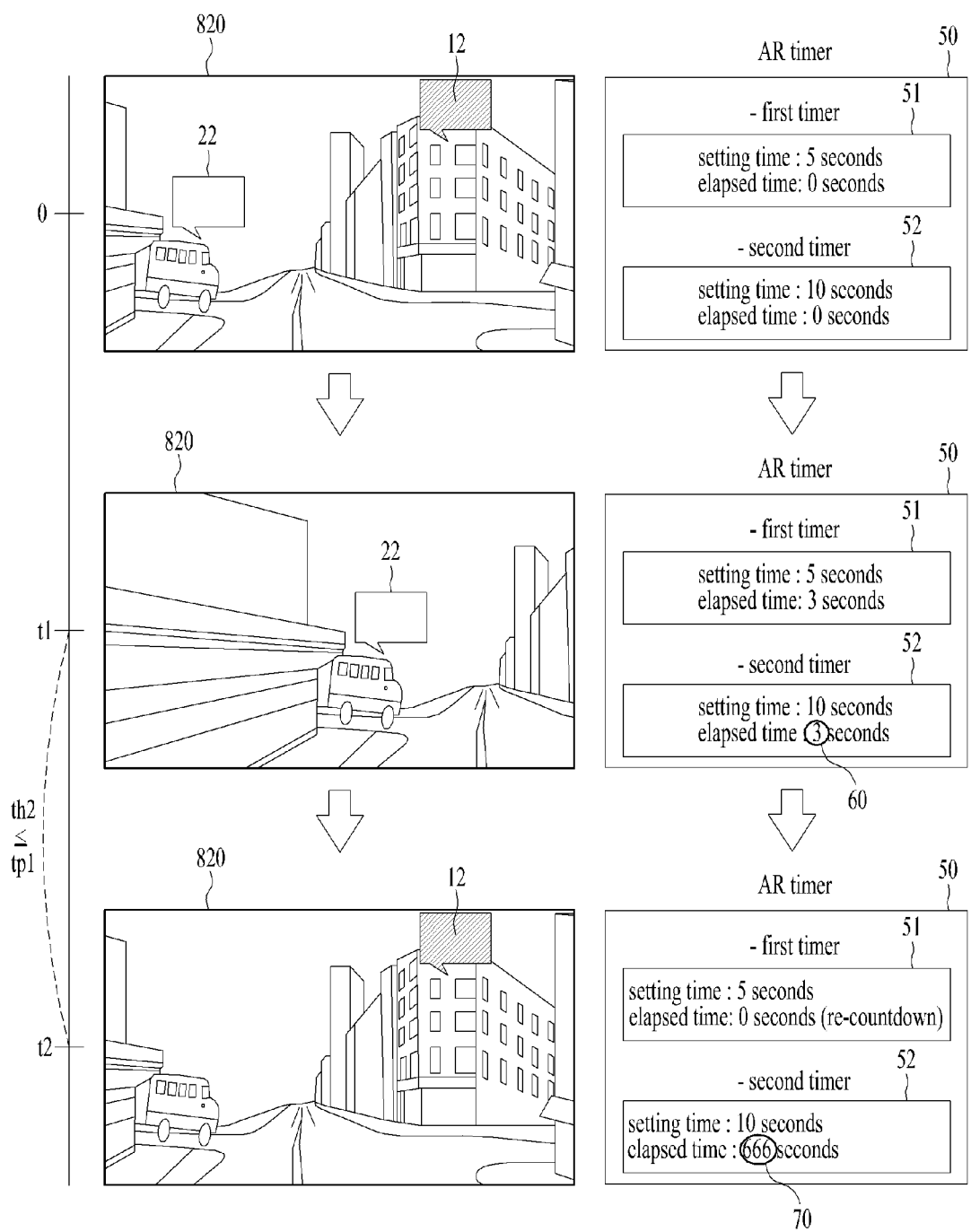

FIG. 8*d* shows a method for the portable device to display a first augmented reality image corresponding to a stationary object when the first time period is more than a second threshold time period. FIG. 8*d* shows an augmented reality timer as well. In FIG. 8d, assume that the first threshold time period and the second threshold time period are set to '5 seconds' and '10 minutes', respectively.

The top left of FIG. 8d shows a method for the portable device to display a first augmented reality image corresponding to a stationary object and a second augmented reality image corresponding to a moving object when the stationary object and the moving object are detected. The top right of FIG. 8d shows an augmented reality timer when the stationary object and the moving object are detected.

Since explanation on two drawings of the top of FIG. 8d is identical to the content mentioned earlier with reference to the two drawings of the top of FIG. 4 and FIG. 5, detailed explanation is omitted.

The middle left of FIG. 8d shows a method for the portable device to display the first augmented reality image when detection on the stationary object is terminated according to a movement or a rotation of the portable device. The middle right of FIG. 8d shows an augmented reality timer when the detection on the stationary object is terminated according to the movement or the rotation of the portable device.

Since explanation on two diagrams of the middle of FIG. 8d is identical to the explanation on the two diagrams of the middle of FIG. 8b, detailed explanation is omitted.

The bottom left of FIG. 8d shows a method for the portable device to display the first augmented reality image when the stationary object is detected again according to the movement or the rotation of the portable device and the bottom right of FIG. 8d shows an augmented reality timer when the stationary object is detected again according to the movement or the rotation of the portable device.

Referring to two diagrams of the bottom of FIG. 8d, if the movement or the rotation of the portable device is detected after the display of the first augmented reality image 12 is terminated and the stationary object is detected again according to the movement or the rotation of the portable device, the portable device may obtain a first time period (tp 1) corresponding to a period between a time (t1) 60 on which detection on the stationary object is terminated and a time (t2) 70 on which the stationary object is detected again. As depicted in the bottom left of FIG. 8d, the portable device may obtain '663 seconds' corresponding to a time period between '3 seconds' and '666 seconds' as the first time period. In this case, as depicted in the drawing, if the first time period is more than a second threshold time period, the portable device displays the first augmented reality image 12 again and may countdown a first timer 51 of the first augmented reality image 12 again. In this case, the second threshold time period may be inputted to the portable device by a user or may correspond to a time period set by a manufacturer in the process of manufacturing the portable device. And, the second threshold time period may correspond to a time period greater than the first threshold time period.

And, when the first augmented reality image 12 is displayed again, the portable device may maintain a first setting time of the first timer 51. For instance, as depicted in the drawing, the portable device may maintain the first setting time of the first timer 51 with '5 seconds' which corresponds to an initial setting time. That is, for instance, if a user used to observe the first augmented reality image and the second augmented reality image intends to observe the first augmented reality image again after moving to a different location and staying at the location for a long time, since it is necessary for the user to display the first augmented reality image for a time period identical to the time taken for initially observing the first augmented reality image, the portable device may maintain the setting time of the first timer for the first augmented reality image.

FIG. 9 is a diagram of a method for a portable device according to a different embodiment of the present specification to display an augmented reality image when the portable device moves or rotates. Although FIG. 9 explains a case that the portable device moves from side to side, following description may also be applied to a case that the portable device moves to every direction or a case that the portable device rotates.

According to FIG. 9, the portable device 900 may include a camera unit 910 and a display unit 920. The portable device 900 may capture a surrounding image located in a front direction of the device using the camera unit 910 within an angle of view 911 area and detect a stationary object 10 and a moving object 20 from the captured image. As mentioned in the foregoing description, the portable device 900 may display a first augmented reality image 12 corresponding to the stationary object and a second augmented reality image 22 corresponding to the moving object on the display unit 920. In addition, the portable device may include a first timer 51 of the first augmented reality image 12 and a second timer 52 of the second augmented reality image 22.

FIG. 9a shows a method for the portable device to display an augmented reality image corresponding to a moving object when the portable device moves or rotates.

The top of FIG. 9a shows a method for the portable device to display a first augmented reality image corresponding to the stationary object and a second augmented reality image corresponding to a moving object when the stationary object and the moving object are detected.

Since explanation on the top of FIG. 9a is identical to the content mentioned earlier with reference to the two drawings of the top of FIG. 4 and FIG. 5, detailed explanation is omitted.

The middle of FIG. 9a shows a method for the portable device to display the second augmented reality image when detection on the moving object is terminated according to a movement or a rotation of the portable device.

Referring to the middle of FIG. 9a, the portable device 900 may detect the movement or the rotation of the portable device using a sensor unit. The portable device 900 may activate the sensor unit when at least one augmented reality image is displayed on the display unit 910. In addition, the portable device 900 may determine whether detection on a moving object 20 is terminated according to the movement or the rotation of the portable device 900. If the movement or the rotation of the portable device 900 is detected and the detection on the moving object 20 is terminated according to the movement or the rotation of the portable device 900, the portable device 900 may terminate a display of a second augmented reality image 22 corresponding to the moving object 20. On the contrary, if the moving object 20 is continuously detected despite of the movement or the rotation of the portable device 900, the portable device 900 may maintain the display of the second augmented reality image 22 corresponding to the moving object 20. And, as depicted in the drawing, if a stationary object 10 is continuously detected despite of the movement or the rotation of the portable device 900, the portable device 900 may maintain a display of a first augmented reality image 12 corresponding to the stationary object 10.

The bottom of FIG. 9a shows a method for the portable device to display the second augmented reality image when the moving object is detected again according to the movement or the rotation of the portable device.

Figure 9B:
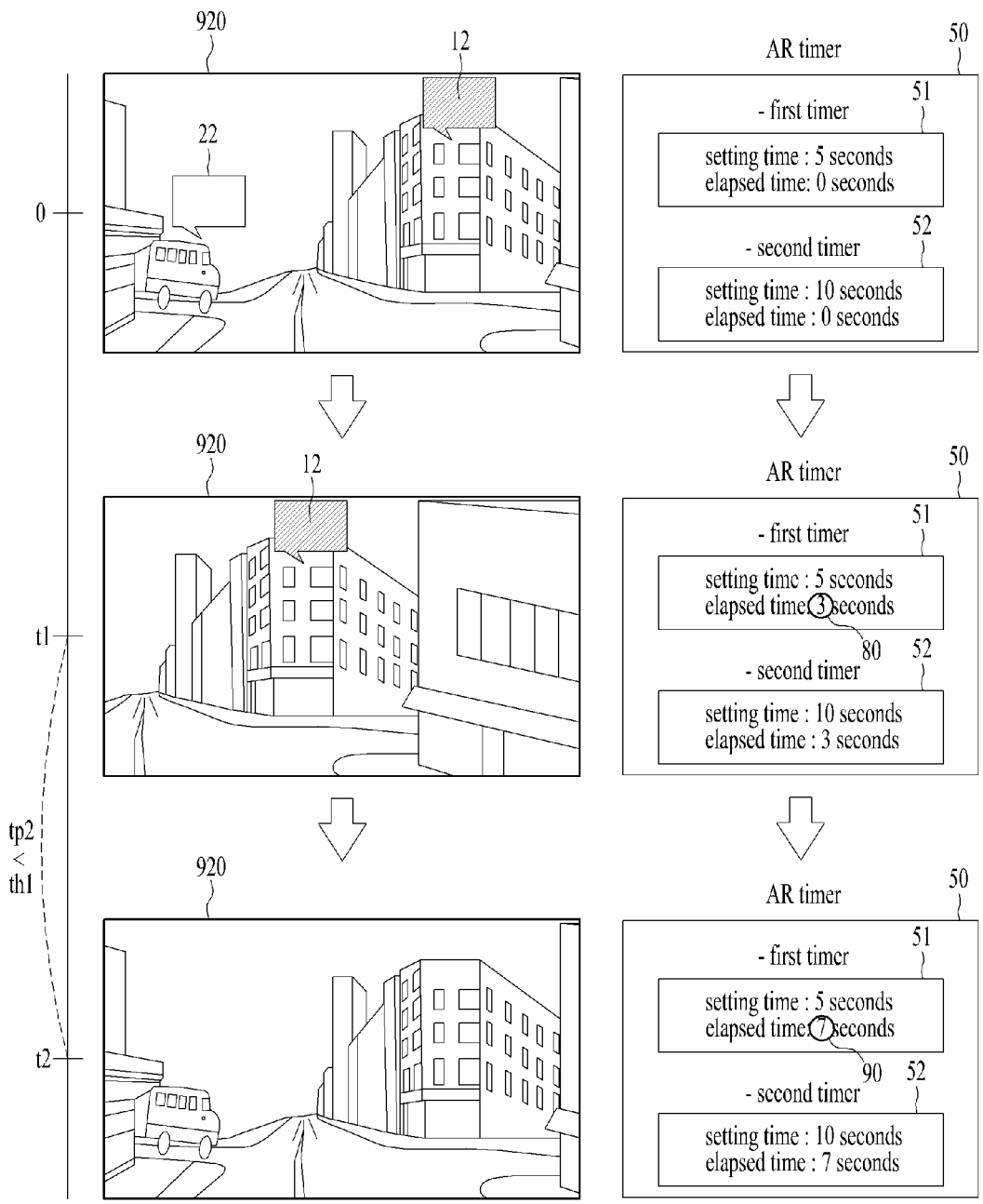

Referring to the bottom of FIG. 9a, if the movement or the rotation of the portable device 900 is detected after the display of the second augmented reality image 22 is terminated and the moving object 20 is detected again according to the movement or the rotation of the portable device 900, the portable device 800 may obtain a second time period (tp 2) corresponding to a period between a time (t1) on which detection on the moving object 20 is terminated and a time (t2) on which the moving object 20 is detected again. If the second time period is less than a first threshold time period, the portable device 900 may not display the second augmented reality image 22 again. On the contrary, if the second time period is more than the first threshold time period, the portable device 900 displays the second augmented reality image 22 again and may countdown a second timer of the second augmented reality image 22 again. In this case, the first threshold time period may be inputted to the portable device 900 by a user or may correspond to a time period set by a manufacturer in the process of manufacturing the portable device 900. The first threshold time period in FIG. 8 and the first threshold time period in FIG. 9 may be different from each other. Regarding this, it shall be explained in detail with reference to FIG. 9b to FIG. 9d in the following.

FIG. 9b shows a method for the portable device to display the second augmented reality image corresponding to the moving object when the second time period is less than the first threshold time period and FIG. 9b shows an augmented reality timer as well. Assume that the first threshold time period is set to '5 seconds' in FIG. 9b.

The top left of FIG. 9b shows a method for the portable device to display a first augmented reality image corresponding to a stationary object and a second augmented reality image corresponding to a moving object when the stationary object and the moving object are detected. The top right of FIG. 9b shows an augmented reality timer when the stationary object and the moving object are detected.

Since explanation on two drawings of the top of FIG. 9b is identical to the content mentioned earlier with reference to the two drawings of the top of FIG. 4 and FIG. 5, detailed explanation is omitted.

The middle left of FIG. 9b shows a method for the portable device to display the second augmented reality image when detection on the moving object is terminated according to a movement or a rotation of the portable device. The middle right of FIG. 9b shows an augmented reality timer when the detection on the moving object is terminated according to the movement or the rotation of the portable device. Since explanation on the middle left of FIG. 9b is identical to the explanation on the middle of FIG. 9a, detailed explanation on an overlapped part is omitted.

Referring to two drawings of the middle of FIG. 9b, the portable device may detect a movement or a rotation of the portable device using a sensor unit. In addition, the portable device may determine whether detection on a moving object is terminated according to the movement or the rotation of the portable device. As depicted in the drawing, if the movement or the rotation of the portable device is detected before a setting time of a second timer 52 for a second augmented reality image 22 elapses and detection on the moving object is terminated according to the movement or the rotation of the portable device, the portable device may terminate the display of the second augmented reality image 22 corresponding to the moving object. On the contrary, if the moving object is continuously detected despite of the movement or the rotation of the portable device, the portable device may maintain the display of the second augmented reality image 22 corresponding to the moving object. And, as depicted in the drawing, if a stationary object is continuously detected despite of the movement or the rotation of the portable device, the portable device may maintain a display of a first augmented reality image corresponding to the stationary object.

The bottom left of FIG. 9b shows a method for the portable device to display the second augmented reality image when the moving object is detected again according to the movement or the rotation of the portable device and the bottom right of FIG. 9b shows an augmented reality timer when the moving object is detected again according to the movement or the rotation of the portable device.

Referring to two diagrams of the bottom of FIG. 9b, if the movement or the rotation of the portable device is detected after the display of the second augmented reality image 22 is terminated and the moving object is detected again according to the movement or the rotation of the portable device, the portable device may obtain a second time period (tp 2) corresponding to a period between a time (t1) 80 on which detection on the moving object is terminated and a time (t2) 90 on which the moving object is detected again. As depicted in the bottom left of FIG. 9b, the portable device may obtain '4 seconds' corresponding to a time period between '3 seconds' and '7 seconds' as the second time period. In this case, as depicted in the drawing, if the second time period is less than a first threshold time period, the portable device may not display the second augmented reality image again. That is, if the moving object is detected again within a short time period (e.g., within '5 seconds') after the detection on the moving object is terminated, the portable device may not display the augmented reality image corresponding to the moving object. By doing so, a user may terminate a display of an uninteresting augmented reality image in a manner of returning the portable device to an original position after the portable device is moved or rotated for a short time. That is, the user may maintain a display of an interesting augmented reality image only.

FIG. 9c shows a method for the portable device to display a second augmented reality image corresponding to a moving object when the second time period is more than a first threshold time period and less than a second threshold time period. FIG. 9c shows an augmented reality timer as well. In FIG. 9c, assume that the first threshold time period and the second threshold time period are set to '5 seconds' and '10 minutes', respectively.

The top left of FIG. 9c shows a method for the portable device to display a first augmented reality image corresponding to a stationary object and a second augmented reality image corresponding to a moving object when the stationary object and the moving object are detected. The top right of FIG. 9c shows an augmented reality timer when the stationary object and the moving object are detected.

Since explanation on two drawings of the top of FIG. 9c is identical to the content mentioned earlier with reference to the two drawings of the top of FIG. 4 and FIG. 5, detailed explanation is omitted.

The middle left of FIG. 9c shows a method for the portable device to display the second augmented reality image when detection on the moving object is terminated according to a movement or a rotation of the portable device. The middle right of FIG. 9c shows an augmented reality timer when the detection on the moving object is terminated according to the movement or the rotation of the portable device.

Since explanation on two diagrams of the middle of FIG. 9c is identical to the explanation on the two diagrams of the middle of FIG. 9c, detailed explanation is omitted.

The bottom left of FIG. 9c shows a method for the portable device to display the second augmented reality image when the moving object is detected again according to the movement or the rotation of the portable device and the bottom right of FIG. 9c shows an augmented reality timer when the moving object is detected again according to the movement or the rotation of the portable device.

Referring to two diagrams of the bottom of FIG. 9c, if the movement or the rotation of the portable device is detected after the display of the second augmented reality image 22 is terminated and the moving object is detected again according to the movement or the rotation of the portable device, the portable device may obtain a second time period (tp 2) corresponding to a period between a time (t1) 80 on which detection on the moving object is terminated and a time (t2) 90 on which the moving object is detected again. As depicted in the bottom left of FIG. 9c, the portable device may obtain '60 seconds' corresponding to a time period between '3 seconds' and '63 seconds' as the second time period. In this case, as depicted in the drawing, if the second time period is more than a first threshold time period and less than a second threshold time period, the portable device displays the second augmented reality image 22 again and may countdown a second timer 52 of the second augmented reality image 22 again. In this case, the second threshold time period may be inputted to the portable device by a user or may correspond to a time period set by a manufacturer in the process of manufacturing the portable device. And, the second threshold time period may correspond to a time period greater than the first threshold time period. And, the first threshold time period in FIG. 8 and the first threshold time period in FIG. 9 may be different from each other.

And, when the second augmented reality image 22 is displayed again, the portable device may adjust a second setting time of the second timer 52. For instance, as depicted in the drawing, the portable device may adjust the second timer 52 to make the second setting time of the second timer 52 to be shortened. That is, if a user used to observe the first augmented reality image and the second augmented reality image intends to observe the second augmented reality image again in a manner of moving the portable device after intensively observing the first augmented reality image for a specific time period in a manner of moving the portable device, since it is not necessary for the portable display to display the previously displayed second augmented reality image again for an identical displaying time, the portable display may shorten the setting time of the second timer of the second augmented reality image.

Figure 9D:
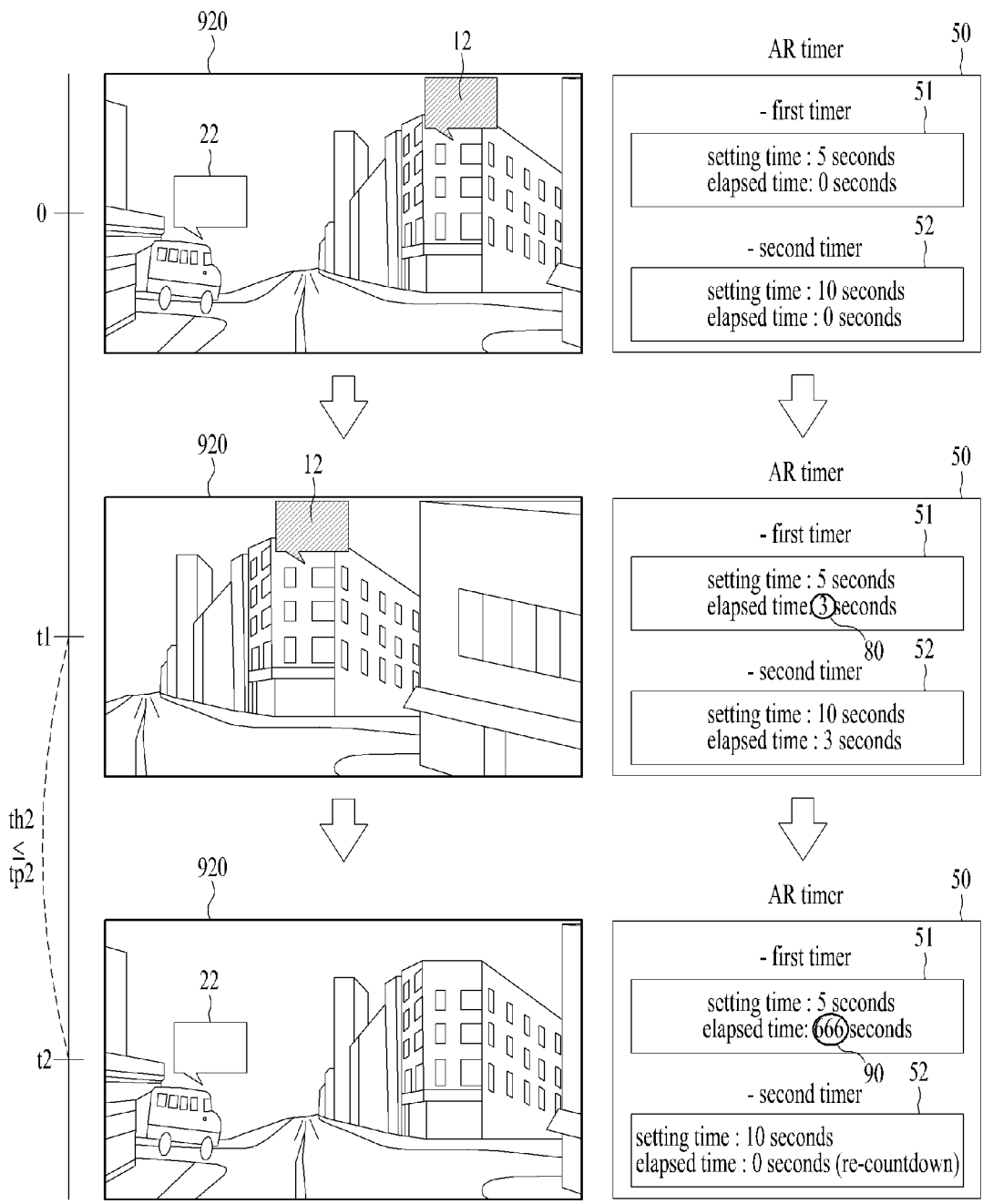

FIG. 9d shows a method for the portable device to display a second augmented reality image corresponding to a moving object when the second time period is more than a second threshold time period. FIG. 9d shows an augmented reality timer as well. In FIG. 9d, assume that the first threshold time period and the second threshold time period are set to '5 seconds' and '10 minutes', respectively.

The top left of FIG. 9d shows a method for the portable device to display a first augmented reality image corresponding to a stationary object and a second augmented reality image corresponding to a moving object when the stationary object and the moving object are detected. The top right of FIG. 9d shows an augmented reality timer when the stationary object and the moving object are detected.

Since explanation on two drawings of the top of FIG. 9d is identical to the content mentioned earlier with reference to the two drawings of the top of FIG. 4 and FIG. 5, detailed explanation is omitted.

The middle left of FIG. 9d shows a method for the portable device to display the second augmented reality image when detection on the moving object is terminated according to a movement or a rotation of the portable device. The middle right of FIG. 9d shows an augmented reality timer when the detection on the moving object is terminated according to the movement or the rotation of the portable device.

Since explanation on two diagrams of the middle of FIG. 9d is identical to the explanation on the two diagrams of the middle of FIG. 9b, detailed explanation is omitted.

The bottom left of FIG. 9d shows a method for the portable device to display the second augmented reality image when the moving object is detected again according to the movement or the rotation of the portable device and the bottom right of FIG. 9d shows an augmented reality timer when the moving object is detected again according to the movement or the rotation of the portable device.

Referring to two diagrams of the bottom of FIG. 9d, if the movement or the rotation of the portable device is detected after the display of the second augmented reality image 22 is terminated and the moving object is detected again according to the movement or the rotation of the portable device, the portable device may obtain a second time period (tp 2) corresponding to a period between a time (t1) 80 on which detection on the moving object is terminated and a time (t2) 90 on which the moving object is detected again. As depicted in the bottom left of FIG. 9d, the portable device may obtain '663 seconds' corresponding to a time period between '3 seconds' and '666 seconds' as the second time period. In this case, as depicted in the drawing, if the second time period is more than a second threshold time period, the portable device displays the second augmented reality image 22 again and may countdown a second timer 52 of the second augmented reality image 22 again. In this case, the second threshold time period may be inputted to the portable device by a user or may correspond to a time period set by a manufacturer in the process of manufacturing the portable device. And, the second threshold time period may correspond to a time period greater than the first threshold time period.

And, when the second augmented reality image 22 is displayed again, the portable device may maintain a second setting time of the second timer 52. For instance, as depicted in the drawing, the portable device may maintain the second setting time of the second timer 52 with '10 seconds' which corresponds to an initial setting time. That is, for instance, if a user used to observe the first augmented reality image and the second augmented reality image intends to observe the second augmented reality image again after moving to a different location and staying at the location for a long time, since it is necessary for the user to display the second augmented reality image for a time period identical to the time taken for initially observing the second augmented reality image, the portable device may maintain the setting time of the second timer for the second augmented reality image.

FIG. 10 is a flowchart for a method of controlling a portable device according to one embodiment of the present specification.

Referring to FIG. 10, the portable device may capture a surrounding image located in a front direction of the device [S1010]. For instance, the portable device may capture the surrounding image of the front direction of the portable device using a camera unit within an angle of view.

If the portable device corresponds to a smartphone, the front direction of the portable device may correspond to a direction to which a camera installed in a rear side of the portable device faces. And, the front direction of the portable device may correspond to an opposite direction of the direction in which a display unit is installed. For instance, if the portable device is equipped with a double-sided display unit, the front direction of the portable device may correspond to a direction to which the camera installed in the front or the rear side of the portable device faces.

On the other hand, if the portable device corresponds to a head mounted display, the front direction of the portable device may correspond to a direction to which the camera installed in the front side of the portable device faces. And, the front direction of the portable device may correspond to a direction to which a gaze of a user faces.

The portable device may detect at least one of a predefined stationary object and a predefined moving object from the captured surrounding image [S1020]. In this case, the stationary object may be defined as a real object incapable of moving a position of the object by itself and the moving object may be defined as a real object capable of moving a position of the object by itself. For instance, a car, a bus, and the like may correspond to the moving object and a building and the like may correspond to the stationary object. The portable device may determine whether an object corresponds to the moving object or the stationary object based on GPS information of the object. For instance, the portable device determines an object including a changing GPS coordinate as the moving object and may determine an object including a fixed GPS coordinate as the stationary object.

In this case, each of the stationary object and the moving object may include a marker of an augmented reality image. In this case, the marker may correspond to a promised pattern or code installed on a surface of a real object or the real object itself. Hence, the portable device may detect the marker of each of the stationary object and the moving object using a camera unit within an angle of view.

If a stationary object is detected, the portable device displays a first augmented reality image corresponding to the stationary object on the display unit and may countdown a first timer of the first augmented reality image [S1030]. In this case, the first timer may include a setting time and an elapsed time of the first timer. A first setting time may be inputted to the portable device by a user or may correspond to a time set by a manufacturer in the process of manufacturing the portable device.

If the portable device corresponds to a smartphone, the portable device may display the stationary object image on the display unit together with the first augmented reality image. By doing so, although a user cannot see the augmented reality image with the naked-eyes, the user may check the augmented reality image via the display unit of the portable device.

On the other hand, if the portable device corresponds to a head mounted display, the portable device may display the first augmented reality image on the stationary object of a real space seen by a user via a see-through panel instead of displaying the image of the stationary object. By doing so, although the user cannot see the augmented reality image with the naked-eyes, the user may check the augmented reality image via the display unit of the portable device.

If the first setting time of the first timer elapses, the portable device may terminate a display of the first augmented reality image corresponding to the stationary object [S1040]. By doing so, the portable device may display the augmented reality image corresponding to the stationary object for a specific time only although the stationary object is continuously detected.

Subsequently, if a moving object is detected, the portable device may display a second augmented reality image corresponding to the moving object on the display unit and may countdown a second timer of the second augmented reality image [S1050]. In this case, the second timer may include a setting time and an elapsed time of the second timer. A second setting time may be inputted to the portable device by a user or may correspond to a time set by a manufacturer in the process of manufacturing the portable device. And, the second setting time of the second timer may be configured by a time different from the aforementioned first setting time of the first timer. For instance, the second setting time may be configured by a time longer than the first setting time. By doing so, a user may longer observe a second augmented reality image corresponding to the moving object than the first augmented reality image corresponding to the stationary object.

The portable device may detect a movement of the moving object [S1060].

The portable device may detect the movement of the moving object based on a location change of the moving object on the surrounding image captured by the camera unit or a location change of an image of the moving object displayed on the display unit. For instance, if the location of the moving object changes from a first location to a second location on the surrounding image captured by the camera unit and a distance between the first location and the second location is detected as the distance longer than a first distance, the portable device may detect the movement of the moving object. As a different example, if a location of the image of the moving object displayed on the display unit changes from a third location to a fourth location and a distance between the third location and the fourth location is detected as the distance longer than the first distance, the portable device may detect the movement of the moving object.

The portable device may detect the movement of the moving object based on a change of a GPS coordinate of the moving object. For instance, if the GPS coordinate of the moving object changes from a first coordinate to a second coordinate and a distance between the first coordinate and the second coordinate is detected as the distance longer than the first distance, the portable device may detect the movement of the moving object. In this case, the first distance may mean a minimum moving distance of the moving object required to detect the movement of the moving object. The first distance may be inputted to the portable device by a user or may correspond to a distance set by a manufacturer in the process of manufacturing the portable device. By doing so, if the moving object stops after moving a very short distance, the portable device may determine it as the moving object does not move.

The portable device may determine whether the movement of the moving object is detected before the second setting time of the second timer elapses [S1070].

If the movement of the moving object is not detected before the second setting time of the second timer elapses, the portable device may terminate a display of a second augmented reality image [S1080].

If the movement of the moving object is detected before the second setting time of the second timer elapses, the portable device may adjust the second timer [S1090]. For instance, the portable device may adjust the second timer in a manner that the second setting time is extended as much as a first extension time. In this case, the first extension time may be inputted to the portable device by a user or may correspond to a time set by a manufacturer in the process of manufacturing the portable device. As a different example, the portable device may adjust the second timer to make the second timer to be reset. That is, the portable device activates the second timer again and may countdown an elapsed time again. By doing so, the portable device enables a user to longer observe the moving object in which the movement is detected.

If the second timer is adjusted, the portable device may determine whether the second setting time of the adjusted second timer elapses. For instance, if the second timer is adjusted in a manner that the second setting time is extended as much as the first extension time, the portable device may determine whether the extended second setting time of the second timer elapses. If the extended second setting time of the second timer does not elapse, the portable device may maintain the display of the second augmented reality image. On the contrary, if the extended second setting time of the second timer elapses, the portable device may terminate the display of the second augmented reality image. And, if the movement of the moving object is detected on a timing that the extended second setting time of the second timer elapses, the portable device may extend the extended second setting time of the second timer again as much as a second extension time. In this case, the second extension time may be inputted to the portable device by a user or may correspond to a time set by a manufacturer in the process of manufacturing the portable device. In this case, the second extension time may be configured by a time shorter than the aforementioned first extension time. And, if the movement of the moving object is detected on a timing that the once more extended second setting time of the second timer elapses, the portable device may further extend the once more extended second setting time of the second timer.

As a different example, when the second timer is adjusted to make the second timer to be reset, the portable device may determine whether the second setting time of the reset second timer elapses. That is, if portable device activates the second timer again and countdowns the elapsed time of the second timer again, the portable device may determine whether the second setting time of the reset second timer elapses. If the second setting time of the reset second timer does not elapse, the portable device may maintain the display of the second augmented reality image. If the second setting time of the reset second timer elapses, the portable device may terminate the display of the second augmented reality image. And, if the movement of the moving object is detected on a timing that the second setting time of the reset second timer elapses, the portable device may reset the second timer again. And, if the movement of the moving object is detected on a timing that the second setting time of the once more reset second timer elapses, the portable device may further reset the once more reset second timer.

And, if the movement of the moving object is continuously detected after the second timer is adjusted, the portable device continuously maintains the display of the second augmented reality image and may stop the countdown of the elapsed time of the second timer. That is, if the movement of the moving object is continuously detected after the second timer is adjusted, the portable device may continuously display the second augmented reality image. In this case, the portable device may countdown the elapsed time of the second timer again when detection on the movement of the moving object is terminated. By doing so, the portable device enables a user to continuously observe the augmented reality image corresponding to the moving object in which the movement is detected.

While the present specification has been described and illustrated herein with reference to the preferred embodiments and diagrams thereof, the present specification may be non-limited to the aforementioned embodiments and it will be apparent to those skilled in the art that various modifications and variations may be made therein without departing from the spirit and scope of the present specification. Thus, it is intended that the present specification covers the modifications and variations of this invention that come within the scope of the appended claims and their equivalents.

Meanwhile, a portable device according to the present specification and a method of controlling therefor may be implemented with a code readable by a processor in a recording media readable by the processor installed in a network device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. The recording media readable by the processor are distributed to the computer systems connected by a network and codes readable by the processor may be stored and executed in a manner of being distributed.

And, it may be considered that an angle, a distance, and a direction described in the present specification may indicate not only a precise angle, distance, and direction but also a practical angle, distance, and direction in a prescribed range and there may exist an error in a prescribed range.

And, both an apparatus invention and a method invention are explained in the present specification and the explanation on the both of the inventions may be complementally applied, if necessary.

What is claimed is:

1. A portable device, comprising:
    a camera unit configured to capture a surrounding image located in a front direction of the portable device;
    a display unit configured to display an image; and
    a processor configured to control the camera unit and the display unit,
    wherein the processor is further configured to:
    detect at least one of a predefined stationary object and a predefined moving object from the captured surrounding image,
    if the stationary object is detected, display a first augmented reality image corresponding to the stationary object and countdown a first timer corresponding to the first augmented reality image,
    terminate a display of the first augmented reality image when a first setting time of the first timer elapses,
    if the moving object is detected, display a second augmented reality image corresponding to the moving object and countdown a second timer corresponding to the second augmented reality image,
    detect a movement of the moving object,
    wherein, if the movement of the moving object is detected before a second setting time of the second timer elapses, adjust the second timer, and
    terminate the display of the second augmented reality image when the second setting time of the second timer elapses,
    wherein, if the movement of the moving object is detected after the display of the second augmented reality image is terminated, redisplay the second augmented reality image and adjust the second timer, and
    wherein the second setting time is different from the first setting time.

2. The portable device of claim 1, wherein the second setting time is longer than the first setting time.

3. The portable device of claim 1, wherein the processor is configured to adjust the second timer to extend the second setting time.

4. The portable device of claim 1, wherein the processor is configured to adjust the second timer to reset the second timer.

5. The portable device of claim 1, wherein the processor is configured to detect the movement of the moving object based on a location change of the moving object on the captured surrounding image.

6. The portable device of claim 5, wherein if a location of the moving object changes from a first location to a second location and a distance between the first location and the second location is more than a first distance, the processor is configured to detect the movement of the moving object.

7. The portable device of claim 1, wherein the processor is further configured to make the second setting time to be shortened when the second timer is adjusted.

8. The portable device of claim 1, wherein if the movement of the moving object is detected, the processor is further configured to display an indicator indicating the movement of the moving object.

9. The portable device of claim 1, further comprising a sensor unit configured to sense a movement or a rotation of the portable device.

10. The portable device of claim 9, wherein the sensor unit is configured to be activated when at least one of the first augmented reality image and the second augmented reality image is displayed.

11. The portable device of claim 9, wherein the processor is further configured to:
    if detection of the stationary object is terminated according to the movement or the rotation of the portable device, terminate the display of the first augmented reality image, and
    if the stationary object is redetected according to the movement or the rotation of the portable device after the display of the first augmented reality image is terminated, obtain a first time period corresponding to a time period between a time on which the detection of the stationary object is terminated and a time on which the stationary object is redetected.

12. The portable device of claim 11, wherein the processor is further configured to:
    not display the first augmented reality image when the first time period is less than a first threshold time period, and
    redisplay the first augmented reality image and re-countdown the first timer of the first augmented reality image when the first time period is greater than the first threshold time period.

13. The portable device of claim 9, wherein the processor is further configured to:
    if detection of the moving object is terminated according to the movement or the rotation of the portable device, terminate the display of the second augmented reality image, and
    if the moving object is redetected according to the movement or the rotation of the portable device after the display of the second augmented reality image is terminated, obtain a second time period corresponding to a time period between a time on which the detection of the moving object is terminated and a time on which the moving object is redetected.

14. The portable device of claim 13, wherein the processor is further configured to:
    not display the second augmented reality image again when the second time period is less than a first threshold time period, and
    redisplay the second augmented reality image and re-countdown the second timer of the second augmented reality image when the second time period is greater than the first threshold time period.

15. The portable device of claim 14, wherein if the second augmented reality image is redisplayed, the processor is further configured to:
    adjust the second setting time of the second timer when the second time period is less than a second threshold time period, and
    maintain the second setting time of the second timer when the second time period is greater than the second threshold time period,
    wherein the second threshold time period exceeds the first threshold time period.

16. The portable device of claim 1, wherein the portable device corresponds to a head mounted display (HMD).

17. The portable device of claim 16, wherein the display unit consists of an optical see-through display panel.

18. A method of controlling a portable device, the method comprising:
    capturing a surrounding image located in a front direction of the portable device;
    detecting at least one of a predefined stationary object and a predefined moving object from the captured surrounding image;
    if the stationary object is detected, displaying a first augmented reality image corresponding to the stationary object and countdown a first timer corresponding to the first augmented reality image;
    terminating a display of the first augmented reality image when a first setting time of the first timer elapses;
    if the moving object is detected, displaying a second augmented reality image corresponding to the moving object and countdown a second timer corresponding to the second augmented reality image;
    detecting a movement of the moving object;
    wherein, if the movement of the moving object is detected before the second setting time of the second timer elapses, adjusting the second timer; and
    terminating the display of the second augmented reality image when a second setting time of the second timer elapses,
    wherein, if the movement of the moving object is detected after the display of the second augmented reality image is terminated, redisplay the second augmented reality image and adjust the second timer, and
    wherein the second setting time is different from the first setting time.

19. The method of claim 18, wherein the second setting time is longer than the first setting time.

* * * * *